(12) United States Patent
Keller et al.

(10) Patent No.: US 7,579,424 B2
(45) Date of Patent: Aug. 25, 2009

(54) CERAMIC MATERIAL MADE FROM SILOXANE-ACETYLENE POLYMER CONTAINING METAL-ACETYLENE COMPLEX

(75) Inventors: Teddy M Keller, Fairfax Station, VA (US); Manoj K Kolel-veetil, Alexandria, VA (US); Syed B Qadri, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 170 days.

(21) Appl. No.: 11/239,454

(22) Filed: Sep. 27, 2005

(65) Prior Publication Data
US 2007/0073038 A1    Mar. 29, 2007

(51) Int. Cl.
C08G 79/08      (2006.01)
C08G 77/398    (2006.01)
C08G 79/00      (2006.01)

(52) U.S. Cl. ............ 528/25; 528/394; 528/396
(58) Field of Classification Search ........ 528/394, 528/395
See application file for complete search history.

(56) References Cited

U.S. PATENT DOCUMENTS

| 4,835,230 A * | 5/1989 | Khasat et al. ............ 526/221 |
| 4,906,710 A * | 3/1990 | Burns et al. ............. 525/474 |
| 5,272,237 A | 12/1993 | Keller et al. |
| 5,276,119 A * | 1/1994 | Kelsey ............ 526/170 |
| 5,292,779 A | 3/1994 | Keller et al. |
| 5,348,917 A | 9/1994 | Keller et al. |
| 5,483,017 A | 1/1996 | Keller et al. |
| 5,552,505 A | 9/1996 | Keller |
| 5,563,181 A | 10/1996 | Keller et al. |
| 5,635,250 A * | 6/1997 | Blum et al. ............ 427/387 |
| 5,635,750 A * | 6/1997 | Schlaak et al. ............ 257/414 |
| 5,679,818 A | 10/1997 | Bucca et al. |
| 5,681,870 A | 10/1997 | Keller et al. |
| 5,756,629 A | 5/1998 | Keller et al. |
| 5,780,569 A | 7/1998 | Keller et al. |
| 5,807,953 A | 9/1998 | Bucca et al. |
| 5,844,052 A | 12/1998 | Keller et al. |

(Continued)

OTHER PUBLICATIONS

Haussler et al. J. Phys. Chem. B 108, 10645-10650 and Supporting Information.*

(Continued)

*Primary Examiner*—Randy Gulakowski
*Assistant Examiner*—Robert Loewe
(74) *Attorney, Agent, or Firm*—John J. Karasek; Joseph T. Frunkomeyer

(57) ABSTRACT

A ceramic made by providing a composition and pyrolyzing the composition. The composition has siloxane polymer, metallic polymer, siloxane thermoset, and/or metallic thermoset having a backbone having: an acetylenic repeat unit; and —$SiR_2$—(O—$SiR_2$)$_n$— and/or —$SiR_2$—(O—$SiR_2$)$_n$-[Cb-$SiR_2$—(O—$SiR_2$)$_n$]$_m$—. R is an organic group, Cb is a carborane, and n and m are integers greater than or equal to zero. Any crosslinking is a crosslink between acetylene groups and/or a polycarbosiloxane crosslink. The composition also has free metal atoms, metal clusters, or metal nanoparticles dispersed homogeneously throughout the composition; $(ML_x)_y$-acetylene complex in the backbone; and/or a metallic compound for forming a $(ML_x)_y$-acetylene complex. M is a metal, L is a ligand, x and y are positive integers.

29 Claims, 9 Drawing Sheets

U.S. PATENT DOCUMENTS

| | | | |
|---|---|---|---|
| 5,874,514 | A | 2/1999 | Keller et al. |
| 5,932,335 | A | 8/1999 | Keller et al. |
| 5,958,324 | A * | 9/1999 | Bujalski et al. ............ 264/470 |
| 5,969,072 | A | 10/1999 | Keller et al. |
| 5,981,678 | A | 11/1999 | Keller et al. |
| 5,986,032 | A * | 11/1999 | Keller et al. ................ 528/5 |
| 6,025,453 | A | 2/2000 | Keller et al. |
| 6,103,178 | A * | 8/2000 | Bujalski et al. ............ 264/470 |
| 6,187,703 | B1 | 2/2001 | Keller et al. |
| 6,225,247 | B1 | 5/2001 | Keller et al. |
| 6,265,336 | B1 | 7/2001 | Keller et al. |
| 6,362,289 | B1 | 3/2002 | Keller et al. |
| 6,495,483 | B1 | 12/2002 | Keller et al. |
| 6,579,955 | B2 | 6/2003 | Keller et al. |
| 6,759,502 | B1 * | 7/2004 | Tang et al. ................ 528/9 |
| 6,767,981 | B1 | 7/2004 | Keller et al. |
| 6,770,583 | B2 | 8/2004 | Keller |
| 6,784,259 | B2 | 8/2004 | Keller et al. |
| 6,784,270 | B1 | 8/2004 | Keller et al. |
| 6,787,615 | B2 | 9/2004 | Keller et al. |
| 6,846,345 | B1 * | 1/2005 | Keller et al. ................ 75/255 |
| 2003/0108477 | A1 * | 6/2003 | Keller et al. ............ 423/447.1 |
| 2005/0148750 | A1 | 7/2005 | Keller |
| 2005/0171316 | A1 | 8/2005 | Keller et al. |
| 2005/0171317 | A1 * | 8/2005 | Keller et al. ................ 528/31 |
| 2006/0199928 | A1 * | 9/2006 | Tang et al. ................ 526/285 |

OTHER PUBLICATIONS

Berenbaum et al. Adv. Mater. 2003, 15, 51-55.*

Haussler et al. Chem. Commun. 1998, 1749-1750.*

Corriu et al., Journal of Organometallic Chemistry, 1996, 509, 249-257.*

Henderson et al., "Synthesis and Characterization of Poly(carborane-siloxane-acetylene)," *Macromolecules*, 27(6), 1660 (1994).

Houser et al., "Linear Ferrocenylene-Siloxyl-Diacetylene Polymers and Their Conversion to Ceramics with High Thermal and Oxidative Stabilities," *Macromolecules*, 31(12), 4038 (1998).

Lindsell et al., "Synthesis and characterization of cobalt and molybdenum complexes derived from linear conjugated diynenes, triynedienes and tetraynetrienes," *J. Organomet. Chem.*, 439(2), 201 (1992).

Masuda et al., "Polymerization of phenylacetylene induced by UV. Irradiation of group 6 transition metal carbonyls," *Polymer*, 23(11), 1663 (1982).

Klinger et al., "Synthesis, reactivity, and molecular structure of cyclopentadienylmolybdenum dicarbonyl dimer. Molybdenum-molybdenum triple bond," *J. Am. Chem. Soc.*, 97(12), 3535 (1975).

Hor et al., "Substituted Metal-Carbonyls Part. XVII. Thermal Decarbonylation and Chelation of $M(CO)_5(\eta$-dppf) and $Fe(CO)_4(\eta$-dppf) [where M = Cr, Mo, W; dppf = $(Ph_2PC_5H_4)_2Fe$]," *Thermochimica Acta*, 178, 287 (1991).

Corriu et al., "Pyrolysis of poly[(silylene) diacetylenes]: direct evidence between their morphology and thermal behavior,"*J. Organomet. Chem.*, 449(1-2), 111 (1993).

Corriu et al., "Organosilicon Polymers: Pyrolysis Chemistry of Poly[(dImethylsilylene)diacetylene]," *OrganometallIcs*, 11(7), 2507 (1992).

* cited by examiner

CERAMIC MATERIAL MADE FROM SILOXANE-ACETYLENE POLYMER CONTAINING METAL-ACETYLENE COMPLEX

U.S. Nonprovisional Patent Application Nos. 11/239,448 and 11/239,452 are incorporated by reference.

BACKGROUND OF THE INVENTION

1. Field of the Invention

The invention generally relates to ceramic materials.

2. Description of Related Art

The synthesis of materials with nanoscale dimensions is one of the most sought after technologies today, as particle size reduction has been postulated to lead to dramatic changes in physical properties. For example, typical ferromagnetic materials exhibit superparamagnetic behavior at particle sizes of 10-15 nm (Cao et al., "Controlling the particle size of amorphous iron nanoparticles," *J. Mater. Res.*, 10, 2952 (1995) (All referenced publications and patent documents are incorporated by reference.). One of the most pressing technology needs today is to find more efficient ways to store and process digital information. One of the possibilities to squeeze more data onto storage devices is by making the currently used magnetic nanoparticles even smaller. Similarly, nanosized superconductors could be used as an active component of novel nanocomposites with advanced useful properties and as principal building blocks of nanoelectronics as well as elements of solid-state quantum bits (qubits) (Schmidt, *The Physics of Superconductors* [Springer-Verlag, Berlin, 1997]). There are currently very few processes available, which can reliably produce nanomagnetic, semiconducting, or superconducting materials of desired sizes under mild conditions.

Most transition metal-based polymers reported to date do not contain units for conversion to a thermoset and thus afford low char yields at elevated temperatures. Carboranylenesiloxanes are highly sought after high temperature, thermally and thermo-oxidatively stable polymers (Dvornic et al., *High temperature Siloxane Elastomers*; Huthig & Wepf: Heidelberg, Germany (1990)). These materials are desirable, especially when it comes to their thermo-oxidative stabilities at very high temperatures. The introduction of unsaturated cross-linkable units such as a diacetylene unit in such materials resulted in the production of extended polymer networks of carboranylenesiloxanes (Henderson et al., "Synthesis and Characterization of Poly(carborane-siloxane-acetylene)," *Macromolecules*, 27(6), 1660 (1994)).

SUMMARY OF THE INVENTION

The invention comprises a ceramic made by a method comprising providing a composition and pyrolyzing the composition. The composition comprises one or more compounds selected from siloxane polymer, metallic polymer, siloxane thermoset, and metallic thermoset. The compound comprising a backbone comprising: an acetylenic repeat unit; and one or more repeat units selected from $-SiR_2-O-SiR_2)_n-$ and $-SiR_2-(O-SiR_2)_n-[Cb-SiR_2-(O-SiR_2)_n]_m-$. Each R is an independently selected organic group, each Cb is an independently selected carborane, and each n and each m is an independently selected integer greater than or equal to zero. Any crosslinking comprises one or more of crosslinks between acetylene groups and polycarbosiloxane crosslinks. The composition also comprises one or more metallic groups selected from free metal atoms, metal clusters, or metal nanoparticles dispersed homogeneously throughout the composition; a $(ML_x)_y$-acetylene complex in the backbone; and a metallic compound capable of reacting with the acetylenic repeat unit to form a $(ML_x)_y$-acetylene complex. Each M is an independently selected metal, each L is an independently selected ligand, and x and y are positive integers.

The invention also comprises a method of making a ceramic comprising providing the above composition and pyrolyzing the composition.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
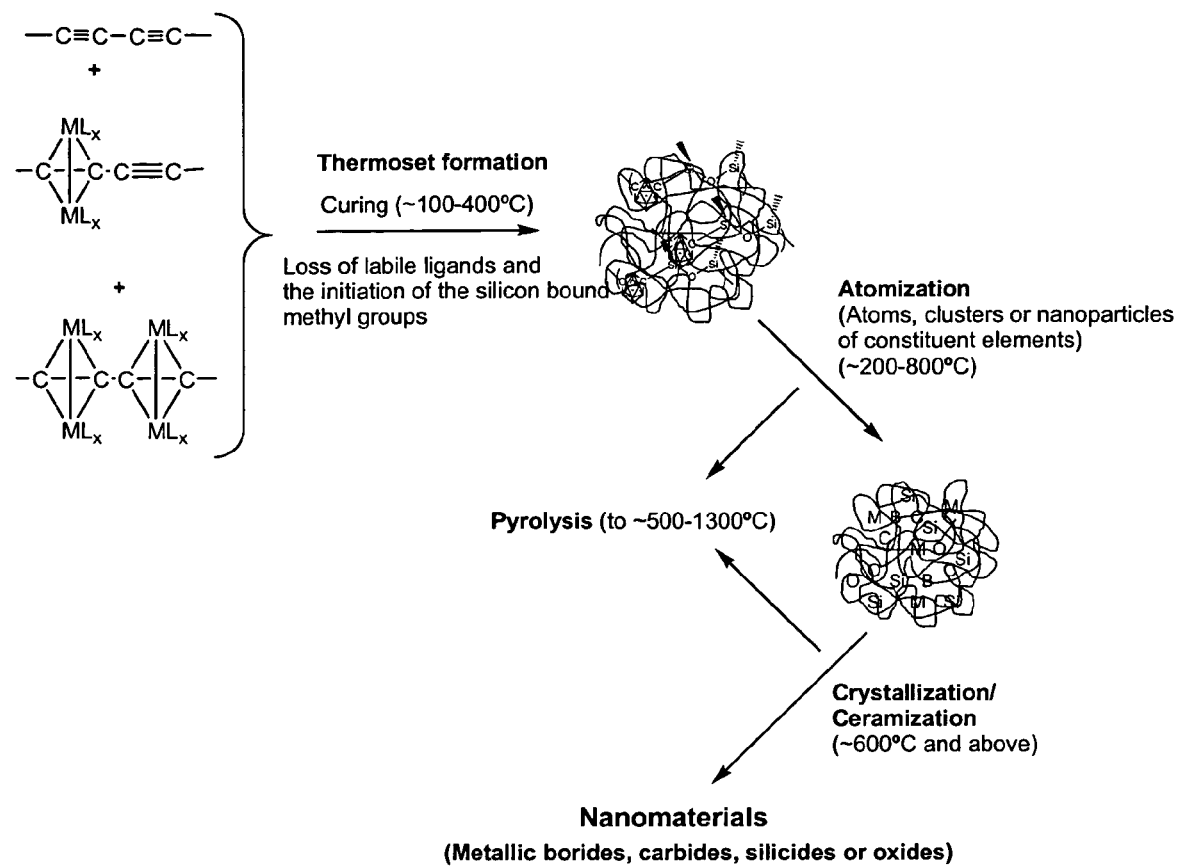
FIG. 1 schematically illustrates some of the processes that can occur when making the ceramic.

In the following description, for purposes of explanation and not limitation, specific details are set forth in order to provide a thorough understanding of the present invention. However, it will be apparent to one skilled in the arts that the present invention may be practiced in other embodiments that depart from these specific details. In other instances, detailed descriptions of well-known methods and devices are omitted so as to not obscure the description of the present invention with unnecessary detail.

Some embodiments may allow for an organometallic pyrolysis route with mild processing conditions for the production of nanomaterials of borides, carbides, and silicides of transition metals and main group metals on their reactions with a group of inorganic-organic hybrid oligomers of siloxanes and carboranylenesiloxanes. The resulting nanomaterials may be magnetic, semiconducting, or superconducting in nature. The process may produce nanomaterials with tunable properties and desired sizes by the manipulation of the processing temperature and the rate of thermal treatment of the metal-derived products of siloxanes or carboranylenesiloxanes. The nature of the product derived from a reactive metal species and a carboranylenesiloxane may be at least partly dictated by the fashion in which the metal is incorporated in the carboranylenesiloxane, i.e., as a part of the main chain (backbone) or as a pendant group. The conducting property of the nanomaterial derived from a particular metal-derived siloxane or carboranylenesiloxane (as to whether it is semiconducting or superconducting) may depend in part on the choice of the pyrolysis temperature. In addition, the resulting nanomaterials may also possess catalytic properties. The size and surface characteristics of the catalytic nanoparticles may depend in part on the processing temperature and the rate of thermal treatment of the precursor thermoset. The identity and property of the derived products may be tailored by judicious placement of the reactant groups in the polymers.

The incorporation of transition metals into a polymer structure may be used to prepare materials with different properties from conventional carbon-based polymers. In general, the rich diversity of coordination numbers and geometries available for transition elements offer the possibility of accessing polymers with unusual conformational, mechanical, and morphological characteristics. The incorporation of transition metals into polymers may be useful in the production of nanomaterials of transition metals if the polymers are thermally and thermo-oxidatively stable materials. In such polymers, their derivatives with transition metals in the main chain structure (either in the backbone or on the chain) may provide access to processable, specialty materials with similarly attractive physical properties of interest as pyrolytic precursors to metal containing polymers and ceramics.

Metal species may be incorporated in the polymer backbone of diacetylene-containing carboranylenesiloxanes (Houser et al., "Linear Ferrocenylene-Siloxyl-Diacetylene Polyrmers and Their Conversion to Ceramics with High Thermal and Oxidative Stabilities," *Macromolecules*, 31(12), 4038 (1998); Keller et al., U.S. Pat. No. 5,844,052). The constituent diacetylene unit, in addition to forming extended networks upon crosslinking, can function as a vehicle for metal incorporation prior to cross-linking as it can form adducts with various metal species. For example, alkynes in general can add across the metal-metal triple bond in $Cp_2Mo_2(CO)_6$ to form adducts of the type $Cp_2Mo_2(CO)_6(\mu-\eta^2:\eta^2-R—C≡C—R)$ with a tetrahedral $C_2Mo_2$ core (Eq. (1)) (Klinge et al., "Synthesis, reactivity, and molecular structure of cyclopentadienylmolybdenum dicarbonyl dimer. Molybdenum-molybdenum triple bond," *J. Am. Chem. Soc.*, 97(12), 3535 (1975)). In fact, under photochemical conditions, some metal complexes are even known to function as catalysts for the crosslinking of acetylenes (Masuda et al., "Polymerization of phenylacetylene induced by UV. Irradiation of group 6 transition metal carbonyls," *Polymer*, 23(11), 1663 (1982)).

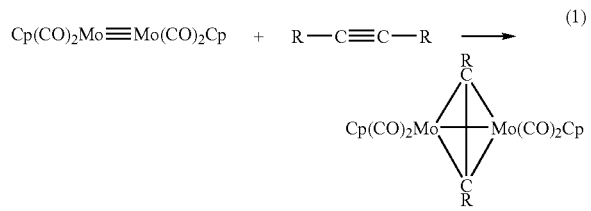

The ceramic is made from a class of compounds being polymers or thermosets comprising a backbone comprising certain repeat units. A siloxane polymer backbone comprises an acetylenic repeat unit and one or more repeat units selected from —SiR$_2$—(O—SiR$_2$)$_n$— and —SiR$_2$—(O—SiR$_2$)$_n$-[Cb-SiR$_2$—(O—SiR$_2$)$_n$]$_m$—. As used herein, the term "siloxane" also includes silanes, as when n is zero. A polycarbosiloxane crosslink also refers to a polycarbosilane crosslink. The acetylenic repeat unit may be crosslinked and still be referred to as an acetylenic repeat unit. Such acetylene and polycarbosiloxane crosslinks are described by Corriu et al., "Organosilicon Polymers: Pyrolysis Chemistry of Poly[(dimethylsilylene)diacetylene]," *Organometallics*, 11(7), 2507 (1992). Polycarbosiloxane crosslinks may be found, among other possibilities, when all the acetylene groups are complexed by using an excess of metallic compound. The backbone may also comprise one or more metallic repeat units selected from metallocenylene, -M'Cp$_2$-, and -M'L'$_z$-. Each M' is a metal, Cp is cyclopentadienyl, each L' is an independently selected ligand, and each z is an integer from 2 to 6. Such metallic repeat units are shown in Eq. (2).

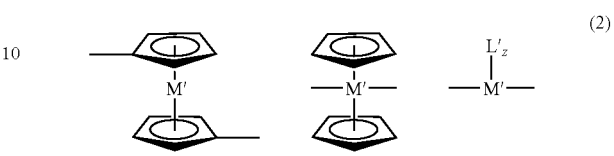

Such siloxane polymers and methods of making them are disclosed in U.S. Pat. Nos. 5,272,237; 5,292,779; 5,348,917; 5,483,017; 5,552,505; 5,563,181; 5,679,818; 5,681,870; 5,756,629; 5,780,569; 5,807,953; 5,844,052; 5,874,514; 5,932,335; 5,969,072; 5,981,678; 5,986,032; 6,025,453; 6,187,703; 6,225,247; 6,265,336; 6,362,289; 6,495,483; 6,579,955; 6,767,981; 6,770,583; 6,784,259; 6,784,270; 6,787,615 to Keller et al. and US Patent Application Publication Nos. 2005/0148750, 2005/0171316, and 2005/0171317 to Keller et al. Generally, such polymers may be made, among other methods, by reacting halogen-terminated units with hydroxyl-terminated units or metal-terminated units, including lithium-terminated units.

Derivatives of the siloxane polymer may also be used in addition to or instead of the siloxane polymer. A metallized polymer contains at least one $(ML_x)_y$-acetylene complex in the backbone and may be made by reaction of the siloxane polymer with a suitable metallic compound. THF may be used as a solvent for this reaction to facilitate the displacement of, for example, the carbonyl ligands. In most solvents, the predominant isomer is trans. In solvents such as DMSO, THF, DMF, hexanes, or mixtures of them, the ratio can be reversed. Between the trans and gauche isomers, the carbonyl exchange or displacement with the lowest energy dynamics is observed in gauche-$Cp_2Mo_2(CO)_6$. Thermosets made by crosslinking the siloxane polymer or the metallized polymer may also be used.

The acetylenic repeat unit comprises one or more acetylene groups, any of which may be $(ML_x)_y$-acetylene complex. In some embodiments, the acetylenic repeat unit is based on diacetylene. Such a repeat unit consists of two groups independently selected from acetylene and $(ML_x)_y$-acetylene complex.

Suitable metals for the M in the complex or metallic compound include, but are not limited to, main group metals, transition metals, lanthanides, actinides, cobalt, molybdenum, ruthenium, iron, copper, vanadium, chromium, tungsten, manganese, technetium, rhenium, osmium, rhodium, iridium, nickel, gold, palladium, platinum, zirconium, magnesium, samarium, and aluminum.

Suitable ligands (L group) for the complex or metallic compound include, but are not limited to, carbonyl, cyclopentadienyl, pentamethylcyclopentadienyl, trimethylsilylcyclopentadienyl, hexafluroacetylacetonate, cyclooctadiene, acetylacetonate, methyl cyanide, methyl, oxide, thiocyanide, chloride, amino, nitro, trifluoromethylsulfide, trifluoroacetylacetonate, cyano, cyanide, and isocyanide.

Suitable Cb groups include, but are not limited to, —CB$_{10}$H$_{10}$C— (dodecacarborane). Suitable R groups include, but are not limited to, methyl. All the R groups may be methyl.

Suitable values for x include, but are not limited to, 1 to 16 or 1 to 12. Suitable values for y include, but are not limited to, 1 to 6 or 1 to 4. Suitable metallic compounds (including metal salts) include, but are not limited to, $V(CO)_6$, $Cr(CO)_6$, $Mo(CO)_6$, $W(CO)_6$, $Mn_2(CO)_{10}$, $Tc_2(CO)_{10}$, $Re_2(CO)_{10}$, $Fe(CO)_5$, $Fe_2(CO)_9$, $Fe_3(CO)_{12}$, $Ru(CO)_5$, $Ru_3(CO)12$, $OS(CO)_5$, $OS_3(CO)_{12}$, $Co_2(CO)_8$, $Co_3(CO)_{12}$, $Co_6(CO)_{16}$, $Rh_4(CO)_{12}$, $Rh_6(CO)_{16}$, $Ir_4(CO)_{12}$, $Ir_6(CO)_{16}$, $Ni(CO)_4$, $Cp(CH_3)_5Re(CO)_3$, $Cp(CH_3)_5Re(CO)_3$, $[Cp(CH_3)_5]_2Cr_2(CO)_4$, $Cp_2Fe_2(CO)_4$, $C_6H_8Fe(CO)_3$, $C_6H_8Fe(CO)_3$, $C_8H_8Fe(CO)_3$, $CpCr(CO)_3$, $Cp_2Mo_2(CO)_6$, $C_7H_8Mo(CO)_3$, $CpMn(CO)_3$, $Cp(Si(CH_3)_3)Mn(CO)_3$, $Cp(CH_3)_5Rh(CO)_2$, $Cp_2Ru_2(CO)_4$, (hexafluroacetylacetonate)Cu(cyclooctadiene), Cr(hexafluroacetylacetonate), Co(acetylacetonate)$(CH_3CN)_4$ Cu(hexafluroacetylacetonate), $(CH_3)_2Au$(acetylacetonate), (cyclooctadiene)Ir(acetylacetonate), Fe(acetylacetonate), Mn(acetylacetonate), $MoO_2$(acetylacetonate)$_2$, Ni(hexafluroacetylacetonate), Ni(cyclooctadiene)$_2$, $Ni(SCN)_2$, $PdCl_2(CH_3CN)_2$, $Pd(NH_3)_2(NO_2)_2$, $Pt(NH_3)_2Cl_2$, Rh(cyclooctadiene)$_2(SO_3CF_3)$, Rh(cyclooctadiene)$Cl_2$, Zr(trifluoroacetylacetonate), $MgCl_2$, $SmCl_2$, and $AlCl_2$.

Suitable metallocenylenes in the metallic repeat unit include, but are not limited to, ferrocenylene. Suitable M' groups include, but are not limited to, main group metals, transition metals, lanthanides, actinides, iron, ruthenium, osmium, molybdenum, zirconium, vanadium, tungsten, titanium, platinum, nickel, rhodium, and palladium. Suitable M' groups for metallocenylene include, but are not limited to, iron, ruthenium, osmium, molybdenum. Suitable M' groups for -M'Cp$_2$- include, but are not limited to, molybdenum, zirconium, vanadium, and tungsten. Suitable M' groups for -M'L'$_z$-, include, but are not limited to, platinum, nickel, rhodium, palladium, and ruthenium. Suitable L' groups include, but are not limited to, amino, ethylene, and cyclooctadiene.

In some embodiments, the siloxane polymer has the structure shown in Eq. (3). Q is the acetylenic repeat unit. Y is the metallic repeat unit. Each p is an integer greater than or equal to zero. Suitable combinations of n, m, and p include, but are not limited to; n is 1, m is 1, and p is zero (Eq.,(4)); n is 1, m is zero, and p is zero (Eq. (5)); n is 1, m is 1, and p is 1 (Eq. (6)); and n is 1, m is zero, and p is 1 (Eq. (7)).

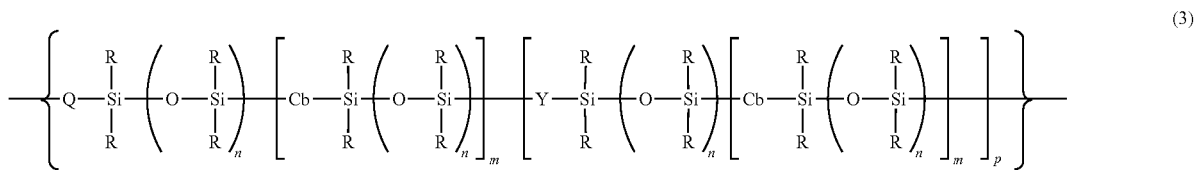

(3)

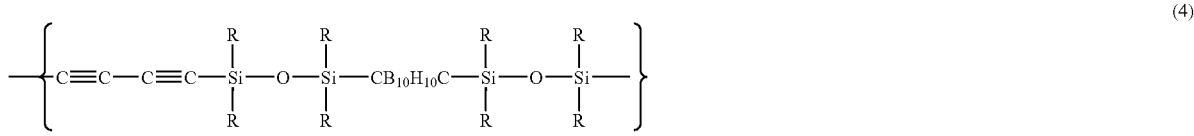

(4)

1

(5)

2

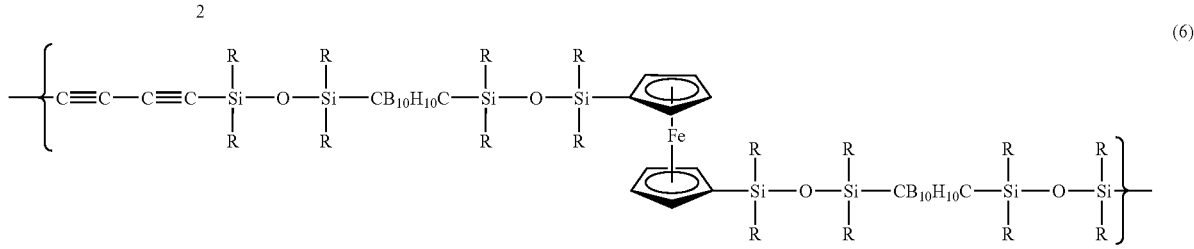

(6)

3

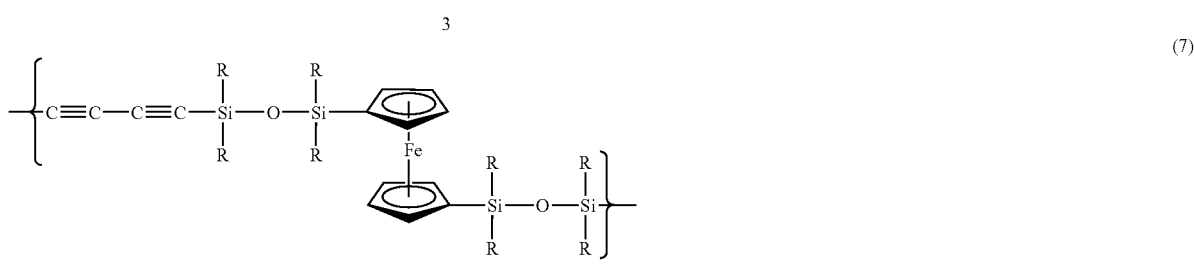

(7)

4

When the composition comprises siloxane polymer and/or siloxane thermoset without any metallized polymer or metallized thermoset, then the composition may also comprise a metallic compound capable of reacting with the acetylenic repeat unit to form a $(ML_x)_y$-acetylene complex. This allows for the formation of $(ML_x)_y$-acetylene complex during the heating process, though such formation is not required. Such a compound may also be in the composition when metallized polymer or thermoset is present. Alternatively the siloxane polymer and/or siloxane thermoset composition may comprise free metal atoms, metal clusters, metal nanoparticles, organometallic compounds, organometallic units, and/or metal salts dispersed homogeneously thoughout the composition. Organometallic compounds and metal salts may be, but are not limited to, reactants used to form the metallized polymer/thermoset, either unreacted or previously reacted and released during the heating. Organometallic units may be, but are not limited to, metallic repeat units in the backbone that have decomposed from the backbone. The ceramic may also comprise carbon nanotubes formed in situ during the heating.

Several processes may occur as the composition is heated and pyrolyzed, as schematically illustrated in FIG. 1. Polymers may crosslink to thermosets. Acetylene crosslinking may be catalyzed by metal components, including decomposed metal salts. Metal complexes may form with the acetylene groups. Metal complexes may decompose to release free metal atoms, which can then agglomerate into metal clusters and/or metal nanoparticles. Such clusters and nanoparticles include both pure metal and metal compounds such as $Mo_2C$. After such decomposition, the decomplexed acetylene may crosslink. Metallic repeat units may decompose from the backbone and also form organometallic units, free metal atoms, metal clusters, and/or metal nanoparticles. Polycarbosiloxane crosslinking can occur. The composition as a whole can char to form a ceramic, producing metallic carbides, silicides, borides, oxides, and a variety of other metal compounds. Whether a metal-boride, -carbide or -silicide was formed, may be at least partly determined by the proximity of the respective reactant atoms in the metal derived polymer and the enthalpies and entropies of formation of the possible products. During the charring process, ligands may be removed and vaporized, such as carbonyl groups. Carbon nanotubes may also be formed.

The reaction of a siloxane polymer or thermoset with a metal carbonyl or a neutral metal complex with labile ligands can be carried out at various ratios of the siloxane and metallic compound. The ratio can be chosen so as to retain a desired fraction of the starting inorganic-organic hybrid polymer in its unreacted and partially reacted forms in the product mixture (Eq. (8)). Such a retention is achieved to provide unreacted and partially reacted diacetylene units in the product mixture for utilization in thermoset formation by their crosslinking reactions. The reactant ratios at least partly dictate the ratio of the product components.

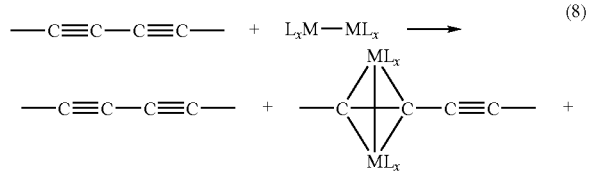

(8)

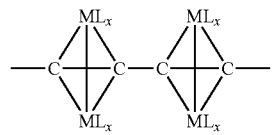

Figure 2A:
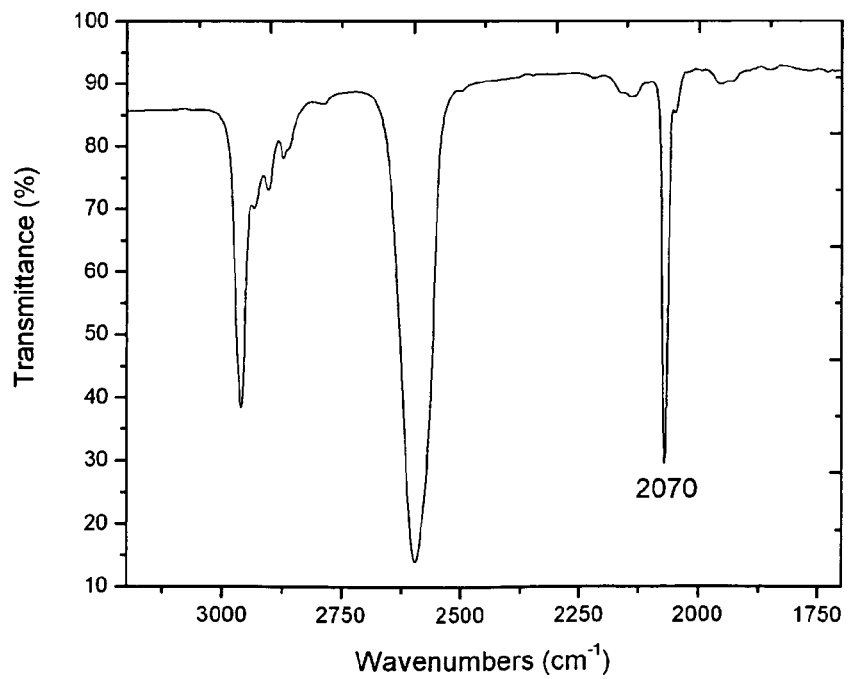
FIG. 2 shows IR spectra demonstrating the formation of a metal-acetylene complex.
Figure 2B:
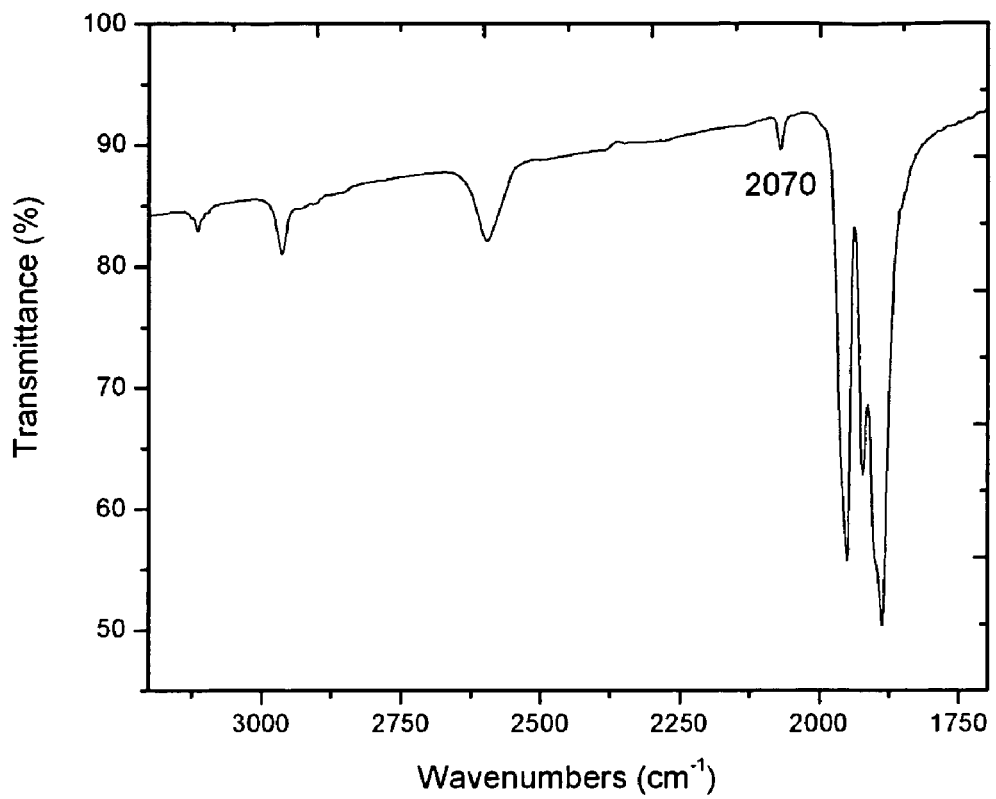

As used herein, a molar ratio of polymer to metal compound refers to the ratio of the acetylenic repeat unit (such as a diacetylene repeat unit) to metal compound. In a reaction using the siloxane polymer shown in Eq. (4) (1) performed at an equimolar ratio of acetylenic repeat units and $Cp_2Mo_2(CO)_6$, three products of the form in Eq. (8) can be formed in various amounts depending on the reaction kinetics. The evidence of the reaction and its progress may be provided by FTIR spectroscopy. The equimolar reaction of $CP_2Mo_2(CO)_6$ with 1 in refluxing THF results in the displacement of two of the carbonyl ligands by the diacetylene, yielding the transient, reactive triply-bonded $Cp_2Mo_2(CO)_6$ and subsequently, a π-bonded complex. As the reaction progresses, the initial IR absorptions Of $CP_2Mo_2(CO)_6$ (1960 and 1915 cm$^{-1}$) (FIG. 2(a)) are replaced by new IR absorptions at 1950, 1923, 1900 and 1891 cm$^{-1}$ of the diacetylene-bound $Cp_2Mo_2(CO)_6$ moieties (FIG. 2(b)). The presence of an unchanged diacetylene absorption at 2070 cm$^{-1}$ in the FTIR spectrum of the final product suggests that a fraction of the starting material remains unreacted as expected. Since the reaction is quantitative in yield, this implies that the starting reactant $Cp_2Mo_2(CO)_6$ has to be distributed among the reacted fraction of the siloxane polymer yielding either a mono or a bis π-coordinated $\eta^5$-cyclopentadienyltetracarbonyl-dimolybdenum complex. Such a formation of π-complexes has been reported in the reaction involving $CP_2Mo_2(CO)_6$ and the conjugated enediyne, E-1,6-bis(trimethylsilyl)hexa-1,5-diyn-3-ene (Lindsell et al., "Synthesis and characterization of cobalt and molybdenum complexes derived from linear conjugated diynenes, triynediynes and tetraynetrienes," *J. Organomet. Chem.*, 439(2), 201 (1992). Further evidence for the retention of a fraction of the siloxane polymer in its unreacted form is obtained from the product's $^{13}C$ NMR spectrum in $CDCl_3$. In the $^{13}C$ NMR spectrum, the NMR resonances of the diacetylene carbons (C1 and C2 in Eq (9)) of the siloxane at δ 87.05 and 84.81 are still evident indicating the presence of some unreacted siloxane polymer. In addition, the resonances for the carbons of the diacetylene units in the mono- and bis-$Cp_2Mo_2(CO)_6$ derivatives are observed at δ 132.46 (C4), 130.86 (C8), 128.79(C5), 111.22 (C3), and 92.29 (C6 and C7). Unique resonances are also observed for the cyclopentadienyl groups (δ 95.72 (PR); δ 91.99 (CR)) and the carbonyl ligands (δ 241.5 (PR), δ 34.1 (PR), 229.8 (PR); 226.5 (CR), 223.9 (CR)) of the π-coordinated mono- and bis-$Cp_2Mo_2(CO)_6$ complexes. The observed $^{13}C$ resonances are well in agreement with similar reported values for the π-coordinated mono- and bis-$Cp_2Mo_2(CO)_6$ complexes formed from the reaction between $Cp_2Mo_2(CO)_6$ and the conjugated enediyne, E-1,6-bis(trimethylsilyl)hexa-1,5-diyn-3-ene (Lindsell, Id.). Together, the FTIR and FTNMR spectroscopic studies of the reaction product confirmed that free diacetylene units and acetylene fragments are available in the product for its conversion into a network system by thermal crosslinking.

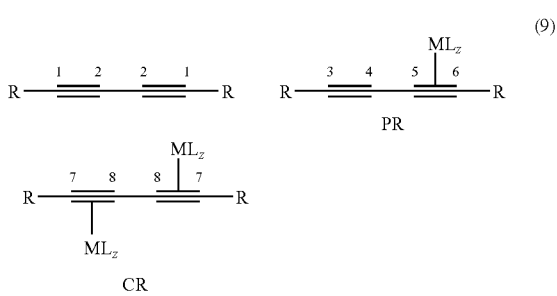

The crosslinking or curing of the polymer/thermoset/metallic component composition may be achieved by the thermal treatment of the product to, for example, about 400° C. in two steps of various durations. On crosslinking, the strands of the oligomers with the partially or completely functionalized diacetylene units may be bound within a tightly crosslinked network system formed by the thermal polymerization of the diacetylene units (in unreacted polymer) and the acetylene fragments (in partially reacted PR). A tightly crosslinked network may enhance the entrapment of the reactant moieties in closer proximity during the initial stage of the pyrolysis thereby facilitating product formation.

Figure 3:
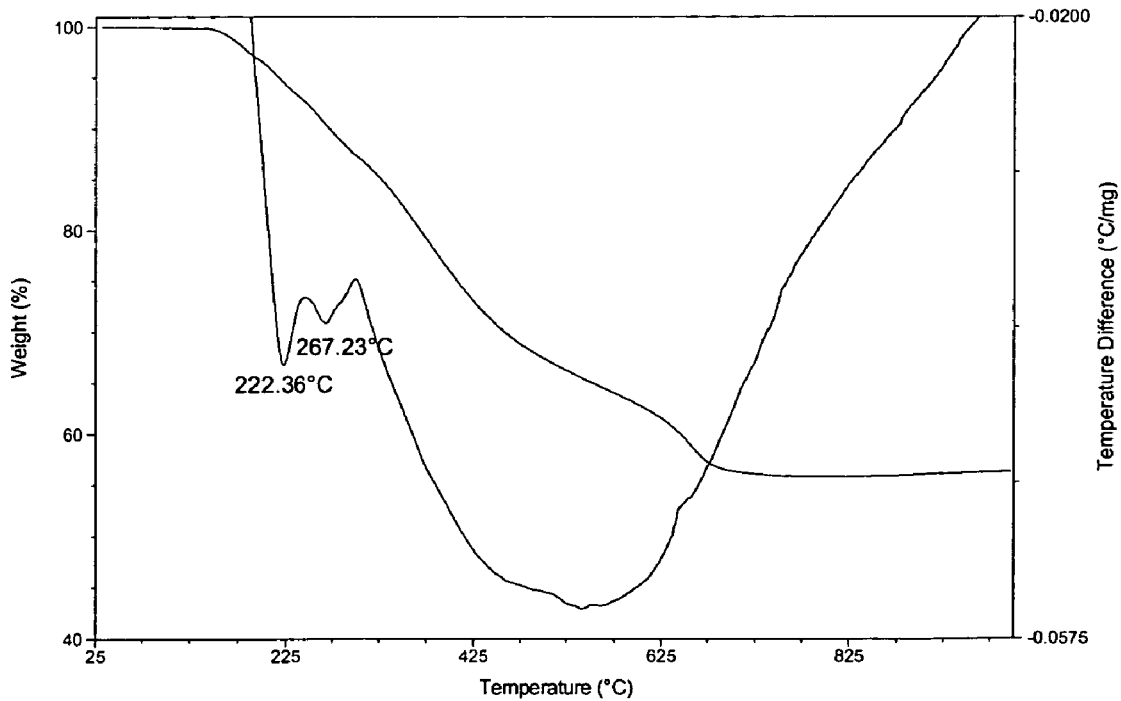
FIG. 3 shows a TGA-DTA thermogram of the adduct of 1 and $Cp_2Mo_2(CO)_6$.

The pyrolysis of the crosslinked network may be achieved by the thermal treatment of the network to an elevated temperature, for example about 1000° C., which may result in the conversion of the matrix to the eventual products. Weight losses during the initial curing and the subsequent pyrolysis of the crosslinked network formed from the adduct of 1 and $Cp_2Mo_2(CO)_6$, were 33% and 11%, respectively. These losses corresponded roughly to the elimination of the labile carbonyl and cyclopentadienyl ligands during the initial curing process and the subsequent expulsion of the silicon-bound methyl groups during the later stages of the curing process and during pyrolysis. The deletion of carbonyls and cyclopentadienyl rings from organometallics has been known to occur at temperatures below 300° C. (Hor et al., "Substituted Metal-Carbonyls Part. XVII. Thermal Decarbonylation and Chelation of $M(CO)_5(\eta\text{-dppf})$ and $Fe(CO)_4(\eta\text{-dppf})$ [where M=Cr, Mo, W; dppf=$(Ph_2PC_5H_4)_2Fe$]," *Thermochimica Acta*, 178, 287 (1991)). The loss of methyl groups from siloxyl units have been reported to occur in the 450-550° C. temperature range (Corriu et al., "Pyrolysis of poly[(silylene)diacetylenes]: direct evidence between their morphology and thermal behavior," *J. Organomet. Chem.*, 449(1-2), 111 (1993)). The evidence for the respective losses of ligands from the crosslinked network can be obtained from a TGA-DTA thermogram of the network by thermally treating it to 1000° C. at 10° C./min. As seen in FIG. 3, the differential curve in the thermogram exhibits two sharper peaks (transitions) around 222° C. and 267° C. and a broader peak centering at 525° C. The sharper peaks represent the successive removal of the carbonyl and the cyclopentadienyl ligands within a narrow temperature range and the latter broad peak originates from the removal of the silicon-bound methyl groups over a large temperature range. Further evidence for the respective removal of the ligands during the crosslinking of the reaction product between 1 and $Cp_2Mo_2(CO)_6$ can also obtained from the solid state FTIR spectra (in KBr pellets) of crosslinked samples obtained by the thermal treatment of the reaction product at 300° C. (for one hour) and 550° C. (for two hours), respectively. In the FTIR spectrum of the former, the IR absorptions of the carbonyls (1950, 1923, 1900, and 1891 $cm^{-1}$) and that of the cyclopentadienyl ligands (3114 $cm^{-1}$) in the reaction product were found to be absent, while in the latter's FTIR spectrum in addition to the carbonyl and cyclopentadienyl absorptions, the absorptions for the silicon-bound methyl groups (1257, 822 $cm^{-1}$, etc.) were also absent. The organometallic derivatives of the inorganic-organic hybrid polymers of this invention essentially may rely on this initial availability of unreacted diacetylene units and the subsequent thermal curing of these units to produce tight crosslinked networks to facilitate their eventual conversion into transition metal nanomaterials by pyrolytic reactions.

Similar reactions of 1, 2, 3, or 4 at desired ratios (for example, 3:1, 1:5, etc.) with a particular metal carbonyl or a labile ligand-containing neutral metal complex can yield differing amounts of the unreacted, partially reacted and completely reacted polymers of 1, 2, 3, or 4.

The precursors and thermosets of the metal adducts of the diacetylene containing poly(siloxanes) and poly(carboranylenesiloxanes) upon thermal treatment above 500° C. can produce several magnetic, semiconducting, and superconducting nanomaterials with tunable properties and desired sizes by the simple manipulation of the processing temperature of the metal-derived products of the inorganic-organic hybrid polymers (linear and network). At a certain temperature, the metallic component of the precursor can commence to decompose in the polymer or the thermoset, resulting in the formation of metal nanoparticles within the networked system. This happens as the temperature of the composition is increased causing the solidification of the sample and the subsequent decomposition of the metallacyclic compound resulting in the formation of initially metal atoms followed by metal clusters and/or metal nanoparticles within the polymeric composition (atomization). The metal species (atoms, clusters, and nanoparticles) can be encapsulated and protected against oxidation by the developing polymeric/ceramic domain. Further heat treatment of the networked or thermosetting system containing the decomposed metal precursor can result in the formation of nanomaterials such as the carbides, borides, and silicides of transition metals, main group metals, lanthanides, and actinides (crystallization/ceramization).

The size and concentration of the metal species may be readily controlled by the amounts of metal component present in the thermoset derived from the metal adduct of the polymer. For example, as the molar concentration of metal component relative to the polymer is increased, metal nanoparticles within the polymer can become strongly coupled giving rise to physical properties in the developing ceramic material resulting from the formation of magnetic nanodomains. The nature of the product derived from a reactive metal species and the concerned inorganic-organic hybrid polymers may be at least partly determined by the fashion in which the metal is incorporated into the polymeric system, i.e., as a part of the main chain (backbone) or as a pendant group.

The conducting property of the nanomaterial derived from a particular metal-derived inorganic-organic hybrid polymer as to whether it is semiconducting, conducting, or superconducting may depend on the choice of the pyrolysis temperature and the crystalline lattice produced. The size and nature of the nanoparticles can further be tailored by the selective treatment of the materials at chosen temperatures. For example, in the pyrolysis reactions involving the thermosets formed from the Mo adduct of 1, the size, nature, and conductivity of the nanomaterials formed depend on the pyrolysis temperature (FIG. 4). It is observed that at lower pyrolysis temperatures, i.e. in the 800-900° C. range, predominantly nanoparticles of cubic α-Mo$_2$C are formed with sizes of 3 nm and below (FIG. 4(a)). The nanoparticles are found to be semiconducting in nature (FIG. 4(b). As the pyrolysis temperature is increased (to 900° C. and above), the formation of a mixture of cubic α-Mo$_2$C and hexagonal (β-Mo$_2$C (40-80 nm in size) nanoparticles results (FIG. 4(c)) with the mixture being superconducting in nature (FIG. 4(d)). The superconductivity of the mixture is assumed to be derived from the hexagonal β-Mo$_2$C, which has been reported to possess such a conducting property. The formation of carbon nanotubes is also observed in this system above a pyrolysis temperature of 900° C. (FIG. 4(e)). At pyrolysis temperatures above 1200° C., the nanomaterials formed from this system are mainly β-Mo$_2$C and Mo nanoparticles (FIG. 4(g)). The mixtures from such pyrolysis are also observed to be superconducting in nature ((FIGS. 4(f), 4(h)), however, with different T$_c$ values.

The thermal treatment or pyrolysis can be carried out either in an inert (argon, N$_2$) atmosphere or in air. Even though, the metal species (atoms, clusters, and nanoparticles) are encapsulated and protected against oxidation by the developing polymeric/ceramic domain, the nature of the pyrolysis environment can have an effect on the nature of the nanomaterials that are produced. For example, in an environment of N$_2$, metal units such as Ti, Zr, Hf, V, Nb, Mo, etc. have the opportunity to form their nitrides at temperatures above 1100° C. Thus, the identity and nature of the nanomaterials that are produced can depend upon the reactant ratio of the metal complex and the polymer, the site of spatial incorporation of the metal unit in the polymer, the rate of temperature treatment and the final pyrolysis temperature, and the atmosphere under which the pyrolysis is conducted.

Having described the invention, the following examples are given to illustrate specific applications of the invention. These specific examples are not intended to limit the scope of the invention described in this application.

Instrumentation—Thermogravimetric analyses (TGA) were performed on a SDT 2960 DTA-TGA analyzer under a nitrogen flow rate of 100 cc/min. The heating rate was 1° C./min, 2° C./min or 10° C./min and the cooling rate was 5° C./min. X-ray analyses were performed using a Rigaku 18 kW X-ray generator and a high-resolution powder diffractometer. X-ray diffraction scans of the samples were measured using Cu Kα-radiation from a rotating anode X-ray source. The temperature dependent dc resistivity measurements were carried out using a standard four probe configuration with the sample slowly lowered into a liquid helium dewar. The value of the resistivity was estimated assuming that the sample was homogeneous and dense and thus should not be taken to be the true bulk value. For TEM analysis, nano-powder was added to ethyl alcohol and the mixture was placed in an ultrasonic cleaner for 5 minutes. A carbon coated 200 mesh copper grid was immersed in the mixture to pick up the nano-powder samples. The specimen was examined in a Philips CM30 microscope operated at 300 kV. The differential scanning calorimetry (DSC) studies were performed on a DSC 2920 modulated DSC instrument and carried out with heating rates of 10° C./min and a nitrogen flow rate of 100 cc/min. Infrared (IR) spectra were obtained on a Nicolet Magna 750 Fourier transform infrared spectrometer. Solution-state. $^{13}$C NMR spectra were acquired on a Bruker AC-300 spectrometer and referenced to the internal solvent peak (chloroform-d, or CDCl$_3$).

EXAMPLE 1

Synthesis of poly(carborane-siloxane-diacetylene), 1—The reaction was initiated in two flasks, the contents of which were later mixed to yield the product.

Flask #1: THF (3.5 mL) and n-butyllithium (3.134 mL, 2.52 M, 7.897 mmol) were transferred to a flame-dried 50 mL flask and the mixture was cooled to −78° C. in a dry ice/2-propanol bath. While stirring, 0.309 mL of hexachlorobutadiene (1.974 mmol) was added drop wise over 15 min. After the addition, the reaction mixture was warmed to room temperature and stirred for 4 h.

Flask #2: A flame-dried 200 mL flask under argon was charged with 0.285 g of m-carborane (1.974 mmol). THF (1 mL) was transferred to this flask and m-carborane was dissolved in it. The reaction flask was immersed in an ice bath and 1.99 mL of a 2.0 M lithium diisopropylamide solution in THF (3.98 mmol) was added drop wise via syringe. After the addition was complete, the mixture was warmed to room temperature and stirred for 2 h. The volatiles were then removed with high vacuum and the solid residue was redissolved in THF (5 mL). The solution was then cooled with an ice bath and 0.77 mL of 1,3-dichlorotetramethyldisiloxane (3.949 mmol) was added drop wise. The ice bath was removed and the reaction was allowed to proceed for another 5 h.

The contents of flask #2 were cooled in an ice bath. The contents of flask #1 were then cannulated into flask #2. The reaction was allowed to proceed overnight. After this period, a few extra drops of the siloxane reagent were added to the mixture and the reaction was continued for two more hours. The mixture was then poured into an aqueous saturated NH$_4$Cl solution (30 mL). The aqueous mixture was extracted with Et$_2$O (3×20 mL). The ether extracts were then combined, dried over Na$_2$SO$_4$ and the dried extracts were filtered through celite. The filtered extracts were subjected to vacuum to remove the ether, which resulted in an oily brown product (1.9 g, 100%). IR (KBr, cm$^{-1}$): 2959 ($v_{C-H}$ Si—CH$_3$), 2921 ($v_{C-H}$ Si—CH$_3$), 2597 ($v_{B-H}$), 2071 ($v_{C-C}$), 1409 ($v_{-CH2}$ bend), 1264 ($v_{Si-C}$), 1059 ($v_{Si-O}$), 801 ($v_{Si-C}$ bend) $^1$H NMR (CDCl$_3$, ppm): 0.008 (Si—CH$_3$), 0.120 (Si—CH$_3$), 0.180 (Si—CH$_3$), 0.210 (Si—CH$_3$), 0.270 (Si—CH$_3$), 3.25-0.72 (C—H, m-carborane). $^{13}$C{$^1$H} NMR (CDCl$_3$, ppm): 0.26 (Si—CH$_3$), 0.52 (Si—CH$_3$), 1.00 (Si—CH$_3$), 1.79 (Si—CH$_3$), 65.92 (m-C$_2$B$_{10}$H$_{10}$), 86.8 (—C—C), and 84.2 (—C—C).

EXAMPLE 2

Synthesis of poly(siloxane-diacetylene), 2—THF (3.5 mL) and n-butyllithium (3.134 mL, 2.52 M, 7.897 mmol) were transferred to a flame-dried 50 mL flask and the mixture was cooled to −78° C. in a dry ice/2-propanol bath. While stirring, 0.309 mL of hexachlorobutadiene (1.974 mmol) was added drop wise over 15 min. After the addition, the reaction mixture was warmed to room temperature and stirred for 4 h. After this period, the reaction flask was cooled again to −78° C. and 0.39 mL of 1,3-dichlorotetramethyldisiloxane (1.975 mmol) was added drop wise. The ice bath was removed and the reaction was allowed to proceed overnight. After this period, a few extra drops of the siloxane reagent were added to the mixture and the reaction was continued for two more hours. The mixture was then poured into an aqueous saturated NH$_4$Cl solution (30 mL). The aqueous mixture was extracted with Et$_2$O (3×20 mL). The ether extracts were then combined, dried over Na$_2$SO$_4$ and the dried extracts were filtered through celite. The filtered extracts were subjected to vacuum to remove the ether, which resulted in an oily brown product (1.9 g, 100%). IR (KBr, cm$^{-1}$): 2959 ($v_{C-H}$ Si—CH$_3$), 2921 ($v_{C-H}$ Si—CH$_3$), 2597 ($v_{B-H}$), 2071 ($v_{C-C}$), 1409 ($v_{-CH2}$ bend), 1264 ($v_{Si-C}$), 1059 ($v_{Si-O}$), 801 ($v_{Si-C}$ bend). $^1$H NMR (CDCl$_3$, ppm): 0.008 (Si—CH$_3$), 0.120 (Si—CH$_3$), 0.180 (Si—CH$_3$), 0.210 (Si—CH$_3$), 0.270 (Si—CH$_3$), 3.25-0.72 (C—H, m-carborane). $^{13}$C{$^1$H} NMR (CDCl$_3$, ppm): 0.26 (Si—CH$_3$), 0.52 (Si—CH$_3$), 1.00 (Si—CH$_3$), 1.79 (Si—CH$_3$), 65.92 (m-C$_2$B$_{10}$H$_{10}$), 86.8 (—C—C), and 84.2 (—C—C).

EXAMPLE 3

Synthesis of poly(carborane-siloxane-diacetylene-siloxane-ferrocene), 3—The reaction was initiated in two flasks, the contents of which were later mixed to yield the product.

Flask 1: Synthesis of Li$_2$Cp$_2$Fe.TMEDA: A Schlenk flask, flame-dried under vacuum, was charged with 1.27 g (6.83 mmol) of ferrocene and 40 mL of hexane under argon. The resulting orange slurry was stirred at room temperature for 1 h. The solution was then treated with 2.07 mL or 1.59 g (13.66 mmol) of TMEDA via syringe. The mixture was cooled to −78° C. in a dry ice/isopropanol bath. 5.44 mL of a 2.5 M n-BuLi solution in hexanes was then added to the mixture and the solution was stirred for 18 h. An orange precipitate had formed at the end of the reaction. The precipitate was collected by filtering the mixture through a fritted funnel that was attached to another flame dried Schlenk flask by connecting the flask to the free end of the funnel followed by inversion of the flask. The precipitate was dissolved in 10 mL of THF for addition to contents of Flask 2.

Flask 2: Synthesis of (Cl-disiloxyl-carboranyl-disiloxyl-diacetylene-disiloxyl-carboranyl-disiloxyl-Cl): THF (10 mL) and n-butyllithium (10.2 mL, 2.50 M, 25.50 mmol) were transferred to a flame-dried 50 mL flask and the mixture was cooled to −78° C. in a dry ice/2-propanol bath. While stirring, 1.10 mL of hexachlorobutadiene (6.830 mmol) was added drop wise over 15 min. After the addition, the reaction mixture was warmed to room temperature and stirred for 3 h. After this period, the mixture was cooled to −78° C. and a preformed solution of Cl-disiloxyl-carboranyl-disiloxyl-Cl (13.660 mmol) was added dropwise to it. The mixture was then stirred at room temperature for 3 h.

The mixture was again cooled to −78° C. and the THF solution of the lithiated ferrocenyl compound from Flask 1 was cannulated into it. The mixture was stirred at room temperature for 2 h, a few drops of the siloxane reagent were added, and the stirring was continued for an hour more. The mixture was then subjected to an aqueous work-up to yield the product. (1.9 g, 100%). IR (KBr, cm$^{-1}$): 3092 (Fc), 2961 ($v_{C-H}$ Si—CH$_3$), 2921 ($v_{C-H}$ Si—CH$_3$), 2599 ($v_{B-H}$), 2075 ($v_{C-C}$), 1414 ($v_{-CH2}$ bend), 1261 ($v_{Si-C}$), 1077 ($v_{Si-O}$), 797 ($v_{Si-C}$ bend). $^1$H NMR (CDCl$_3$, ppm): 0.008 (Si—CH$_3$), 0.120 (Si—CH$_3$), 0.180 (Si—CH$_3$), 0.210 (Si—CH$_3$), 0.270 (Si—CH$_3$), 3.25-0.72 (C—H, m-carborane). $^{13}$C{$^1$H} NMR (CDCl$_3$, ppm): 0.26 (Si—CH$_3$), 0.52 (Si—CH$_3$), 1.00 (Si—CH$_3$), 1.79 (Si—CH$_3$), 65.92 (m-C$_2$B$_{10}$H$_{10}$), 86.8 (—C—C), and 84.2 (—C—C).

EXAMPLE 4

Synthesis of poly( ferrocene-siloxane-diacetylene), 4—THF (10 mL) and n-butyllithium (10.2 mL, 2.50 M, 25.50 mmol) were transferred to a flame-dried 50 mL flask and the mixture was cooled to −78° C. in a dry ice/2-propanol bath. While stirring, 1.10 mL of hexachlorobutadiene (6.830 mmol) was added drop wise over 15 min. After the addition, the reaction mixture was warmed to room temperature and stirred for 3 h. After this period, the mixture was cooled to −78° C. and 2.66 mL of the dichlorotetramethyldisiloxane reagent (13.660 mmol) was added dropwise to it. The mixture was then stirred at room temperature for 3 h. The mixture was again cooled to −78° C. and a 10 mL THF solution, prepared in a separate flask, of 2.9 g of the lithiated ferrocenyl compound (6.830 mmol) was cannulated into the mixture. The mixture was stirred at room temperature for 2 h, a few drops of siloxane reagent were added, and the stirring was continued for an hour more. The mixture was then subjected to an aqueous work-up to yield the product. (1.9 g, 100%). IR (KBr, cm$^{-1}$): 3092 (Fc), 2961 ($v_{C-H}$ Si—CH$_3$), 2921 ($v_{C-H}$ Si—CH$_3$), 2599 ($v_{B-H}$), 2075 ($v_{C-C}$), 1414 ($v_{-CH2\ bend}$), 1261 ($v_{Si-C}$), 1077 ($v_{Si-O}$), 797 ($v_{Si-C\ bend}$). $^1$H NMR (CDCl$_3$, ppm): 0.008 (Si—CH$_3$), 0.120 (Si—CH$_3$), 0.180 (Si—CH$_3$), 0.210 (Si—CH$_3$), 0.270 (Si—CH$_3$), 3.25-0.72 (C—H, m-carborane). $^{13}$C{$^1$H} NMR (CDCl$_3$, ppm): 0.26 (Si—CH$_3$), 0.52 (Si—CH$_3$), 1.00 (Si—CH$_3$), 1.79 (Si—CH$_3$), 65.92 (m-C$_2$B$_{10}$H$_{10}$), 86.8 (—C—C), and 84.2 (—C—C).

EXAMPLE 5

Reaction of Co$_2$(CO)$_8$ with 1 at a ratio of Co:1=1:1—Reagents 1(0.5 g, 1.099 mmol) and Co$_2$(CO)$_8$ (0.365 g, 1.099 mmol) were taken in separate flame dried Schlenk flasks under argon. The reagents were dissolved in the non-polar solvent hexane and cooled to −78° C. in dry ice/isopropanol bath. Subsequently, the solution of 1 was transferred to the flask containing the Co reagent solution using a cannula. After the addition, the solution was warmed to room temperature. The reaction was monitored by the periodic investigation of the reaction mixture by FTIR spectroscopy. It was allowed to proceed until the disappearance of the carbonyl absorptions of Co$_2$(CO)$_8$ (absorptions for Co$_2$(CO)$_8$ are 2022, 1847, and 1828 cm$^{-1}$) was achieved. (In this case, the completion of the reaction was indicated by three new carbonyl absorptions at 2097, 2062, and 2030 cm$^{-1}$ and a remnant diacetylene absorption at 2070 cm$^{-1}$ in the product's IR). The product (yield=99.5%) was collected by removing hexane under vacuum with the flask placed in an oil bath at 80° C. Yield=99.9%.

EXAMPLE 6

Thermoset formation from the reaction product in Example 5—A 0.1 g portion of the reaction product from Example 5 was taken in a ceramic crucible and was placed in a TGA instrument. The sample was thermally treated either in N$_2$ to 400° C. The thermal treatment involved the following two steps. Initially, the sample was heated to 250° C. at 10° C./min and held at that temperature for half an hour. Subsequently, the temperature of the sample was raised to 400° C. at 10° C./min and held at that temperature for two hours. After the thermal treatment, the thermoset was allowed to attain ambient temperature in the TGA instrument.

EXAMPLE 7

Figure 5:
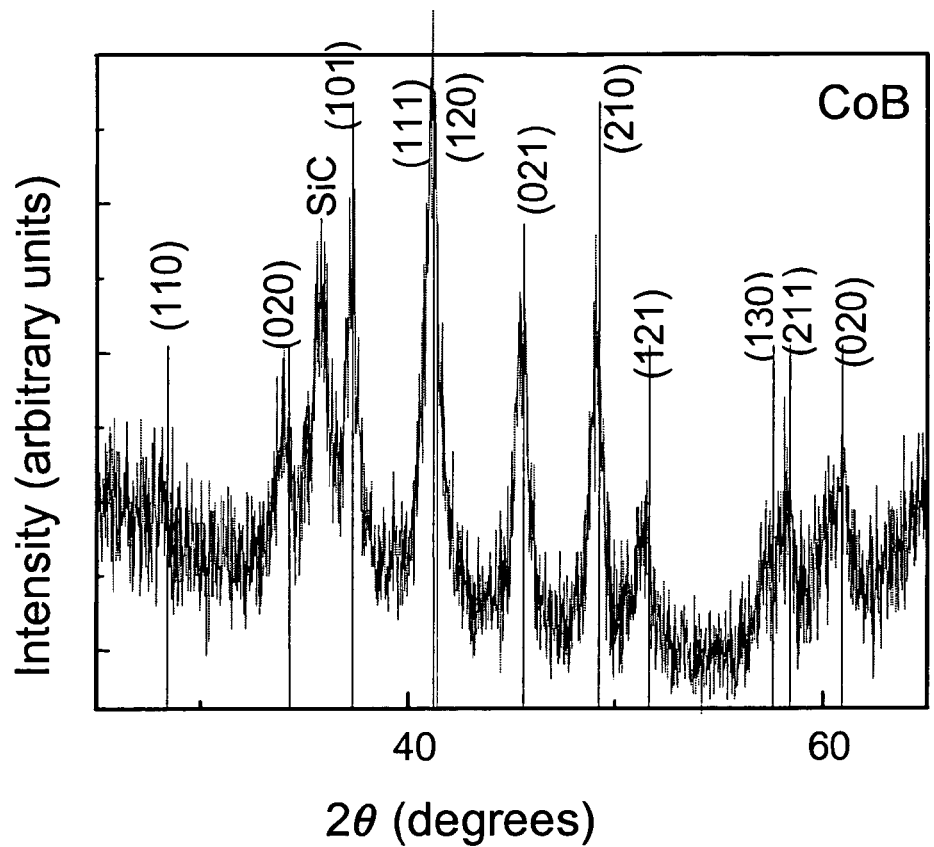
FIG. 5 shows the X-ray diffraction spectrum of the pyrolysis residue obtained in Example 7.

Pyrolysis of the thermoset from Example 6—A portion (80 mg) of the thermoset was placed in a ceramic crucible in a TGA instrument under an atmosphere of N$_2$ and the sample was thermally treated to 1000° C. at 10° C./min. After the thermal treatment the sample was allowed to attain ambient temperature in the TGA instrument. A shaped ceramic sample resulted from the, thermal treatment, which was analyzed by X-ray diffraction spectroscopy (FIG. 5). 90% of the Co units in the sample were found to be present as nanoparticles of CoB with the rest being present as amorphous Co compounds of Si and B. The CoB nanoparticles were found to be of 30-60 nm sizes. Nanoparticles of SiC were also observed in the pyrolysis residue. The CoB nanoparticles were found to be magnetic in nature.

EXAMPLE 8

Reaction of $Co_2(CO)_8$ with 1 at a ratio of Co:1=1:5—A Schlenk flask, flame-dried under vacuum, was charged with 0.073 g (0.220 mmol) of $Co_2(CO)_8$ and 15 mL of hexane was syringed into it under argon to produce a solution of the Co reactant. The solution was cooled to −78° C. in dry ice/isopropanol bath. In another flame-dried Schlenk flask 0.5 g (1.099 mmol) of 1 was dissolved in 35 mL of hexane and the solution was cannulated into the former flask via cannula. After the addition, the solution was allowed to warm to room temperature when a reddish brown solution resulted. An IR spectrum of the aliquot was obtained after 30 min of stirring. The spectrum exhibited no carbonyl absorptions of $Co_2(CO)_8$. Instead there were new carbonyl absorptions at 2097, 2062, and 2030 $cm^{-1}$ that had resulted from the species derived from $Co_2(CO)_8$ on reaction with 1. (In this case, the completion of the reaction is indicated by three new carbonyl absorptions at 2097, 2062, and 2030 $cm^{-1}$ and a remnant diacetylene absorption at 2070 $cm^{-1}$ in the product's IR. The intensity of the diacetylene absorption is 2-3 times more than that in the Co:1=1:1 reaction). The reaction was stopped at this point and the solvents were removed under vacuum with the flask placed in an oil bath at 80° C. Yield =99.9%.

EXAMPLE 9

Thermoset formation from the reaction product in Example 8—A 0.1 g portion of the reaction product from Example 8 was taken in a ceramic crucible and was placed in a TGA instrument. The sample was thermally treated as described in Example 6.

EXAMPLE 10

Pyrolysis of the thermoset from Example 9—A portion (80 mg) of the thermoset was placed in a ceramic crucible in a TGA instrument and was thermally treated as in Example 7. A. shaped ceramic sample resulted from the thermal treatment, which was analyzed by X-ray. diffraction spectroscopy. 90% of the Co units in the sample were found to be present as nanoparticles of CoB with the rest being present as amorphous Co compounds of Si and B. The CoB nanoparticles were found to be of 10-20 nm sizes. Nanoparticles of SiC were also observed in the pyrolysis residue.

EXAMPLE 11

Reaction of $Co_2(CO)_8$ with 1 at a ratio of Co:1=3:1)—A Schlenk flask, flame-dried under vacuum, was charged with 1.095 g (3.297 mmol) of $Co_2(CO)_8$ and 25 mL of hexane was syringed into it under argon to produce a solution of the Co reactant. The solution was cooled to −78° C. in dry ice/isopropanol bath. In another flame-dried Schlenk flask 0.5 g (1.099 mmol) of 1 was dissolved in 40 mL of hexane and the solution was cannulated into the former flask via cannula. After the addition, the solution was allowed to warm to room temperature when a reddish brown solution resulted. An IR spectrum of the aliquot was obtained after 30 min of stirring. The spectrum exhibited no carbonyl absorptions of $Co_2(CO)_8$. Instead there were new carbonyl absorptions at 2097, 2062, and 2030 $cm^{-1}$ that had resulted from the species derived from $Co_2(CO)_8$ on reaction with 1. (In this case, the completion of the reaction is indicated by three new carbonyl absorptions and remnant of $Co_2(CO)_8$ absorptions in the product's IR). The reaction was stopped at this point and the solvents were removed under vacuum with the flask placed in an oil bath at 80° C. Yield=99.9%.

EXAMPLE 12

Thermoset formation from the reaction product in Example 11—A 0.1 g portion of the reaction product from Example 11 was taken in a ceramic crucible and was placed in a TGA instrument. The sample was thermally treated as described in Example 6.

EXAMPLE 13

Pyrolysis of the thermoset from Example 12—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. 90% of the Co in the sample was found to be present as nanoparticles of Co with the rest being present as amorphous Co compounds of Si and B. The Co nanoparticles were found to be of 80-90 nm sizes. Nanoparticles of SiC were also observed in the pyrolysis residue.

EXAMPLE 14

Reaction of $Co_2(CO)_8$ with 2 at a ratio of Co:2=1:1—Reagents 2 (0.198 g, and $Co_2(CO)_8$ (0.365g, 1.099 mmol) were taken in separate flame dried Schlenk flasks under argon. The reagents were dissolved in the non-polar solvent hexane and cooled to −78° C. in dry ice/isopropanol bath. Subsequently, the solution of 2 was transferred to the flask containing the Co reagent solution using a cannula. The observations during the monitoring of the reaction (by FTIR spectroscopy) and the workup of the product were as in Example 5. Yield =99.5%.

EXAMPLE 15

Thermoset formation from the reaction product in Example 14—A 0.1 g portion of the reaction product from Example 14 was taken in a ceramic crucible and was placed in a TGA instrument. The sample was thermally treated as described in Example 6.

EXAMPLE 16

Pyrolysis of the thermoset from Example 15—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. Essentially all of the Co units in the sample were found to be present as nanoparticles of Co of 60-80 nm sizes. Nanoparticles of SiC were also observed in the pyrolysis residue.

EXAMPLE 17

Reaction of $Co_2(CO)_8$ with 2 at a ratio of Co:2=1:5—A Schlenk flask, flame-dried under vacuum, was charged with 0.073 g (0.220 mmol) of $Co_2(CO)_8$ and 15 mL of hexane was syringed into it under argon to produce a solution of the Co reactant. The solution was cooled to −78° C. in dry ice/isopropanol bath. In another flame-dried Schlenk flask 0.198 g (1.099 mmol) of 2. was dissolved in 35 mL of hexane and the solution was cannulated into the former flask via cannula. After the addition, the solution was allowed to warm to room temperature When a reddish brown solution resulted. The observations during the monitoring of the reaction (by FTIR spectroscopy) and the workup of the product were as in Example 8. Yield=99.5%.

EXAMPLE 18

Thermoset formation from the reaction product in Example 17—A 0.1 g portion of the reaction product from Example 17 was taken in a ceramic crucible and was placed in a TGA instrument. The sample was thermally treated as described in Example 6.

EXAMPLE 19

Pyrolysis of the thermoset from Example 18—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. Essentially all of the Co units in the sample were found to be present as nanoparticles of Co of 30-50 nm sizes. Nanoparticles of SiC were also observed in the pyrolysis residue.

EXAMPLE 20

Reaction of $Co_2(CO)_8$ with 2 at a ratio of Co:2=3:1—A Schlenk flask, flame-dried under vacuum, was charged with 1.095 g (3.297 mmol) of $Co_2(CO)_8$ and 25 mL of hexane was syringed into it under argon to produce a solution of the Co reactant. The solution was cooled to −78° C. in dry ice/isopropanol bath. In another flame-dried Schlenk flask 0.198 g (1.099 mmol) of 2 was dissolved in 40 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 11. Yield=99.5%.

EXAMPLE 21

Thermoset formation from the reaction product in Example 20—A 0.1 g portion of the reaction product from Example 20 was taken in a ceramic crucible and was placed in a TGA instrument. The sample was thermally treated as described in Example 6.

EXAMPLE 22

Pyrolysis of the thermoset from Example 21—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. Essentially all of the Co units in the sample were found to be present as nanoparticles of Co (90-110 nm). Nanoparticles of SiC were also observed in the pyrolysis residue.

EXAMPLE 23

Reaction of $Co_2(CO)_8$ with 3 at a ratio of Co:3=1:1—Reagents 3 (0.842 g, and $Co_2(CO)_8$ (0.365 g, 1.099 mmol) were taken in separate flame dried Schlenk flasks under argon. The reagents were dissolved in the non-polar solvent hexane and cooled to −78° C. in dry ice/isopropanol bath. Subsequently, the solution of 3 was transferred to the flask containing the Co reagent solution using a cannula. After the addition, the solution was warmed to room temperature. The observations during the monitoring of the reaction (by FTIR spectroscopy) and the workup of the product were as in Example 5. Yield=99.5%.

EXAMPLE 24

Thermoset formation from the reaction product in Example 23—A 0.1 g portion of the reaction product from Example 23 was taken in a ceramic crucible and was placed in a TGA instrument. The sample was thermally treated as described in Example 6.

EXAMPLE 25

Pyrolysis of the thermoset from Example 24—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. 85% of the Co units in the sample were found to be present as nanoparticles of FeCoB (30-50 nm). 10% of the Co units were present as Co nanoparticles (30-50 nm) with the rest as amorphous Co compounds of Si and B. Nanoparticles of SiC were also observed in the pyrolysis residue.

EXAMPLE 26

Reaction of $Co_2(CO)_8$ with 3 at a ratio of Co:3=1:5—A Schlenk flask, flame-dried under vacuum, was charged with 0.073 g (0.220 mmol) of $Co_2(CO)_8$ and 15 mL of hexane was syringed into it under argon to produce a solution of the Co reactant. The solution was cooled to −78° C. in dry ice/isopropanol bath. In another flame-dried Schlenk flask 0.842 g (1.099 mmol) of 3 was dissolved in 35 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 8. Yield=99.5%.

EXAMPLE 27

Thermoset formation from the reaction product in Example 26—A 0.1 g portion of the reaction product from Example 26 was taken in a ceramic crucible and was placed in a TGA instrument. The sample was thermally treated as described in Example 6.

EXAMPLE 28

Pyrolysis of the thermoset from Example 27—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. 85% of the Co units in the sample were found to be present as nanoparticles of FeCoB (20-30 nm). 10% of the Co units were present as Co nanoparticles (20-30 nm) with the rest as amorphous Co compounds of Si and B. Nanoparticles of SiC were also observed in the pyrolysis residue. The FeCoB nanoparticles were found to be magnetic in nature.

EXAMPLE 29

Reaction of $Co_2(CO)_8$ with 3 at a ratio of Co:3=3:1—A Schlenk flask, flame-dried under vacuum, was charged with 1.095 g (3.297 mmol) of $Co_2(CO)_8$ and 25 mL of hexane was syringed into it under argon to produce a solution of the Co reactant. The solution was cooled to −78° C. in dry ice/isopropanol bath. In another flame-dried Schlenk flask 0.842 g (1.099 mmol) of 3 was dissolved in 40 mL of hexane and the solution was cannulated into the former flask via cannula. After the addition, the solution was allowed to warm to room temperature when, a reddish brown solution resulted. The observations during the monitoring of the reaction (by FTIR spectroscopy) and the workup of the product were as in Example 11. Yield=99.5%.

EXAMPLE 30

Thermoset formation from the reaction product in Example 29—A 0.1 g portion of the reaction product from Example 29 was taken in a ceramic crucible and was placed in a TGA instrument. The sample was thermally treated as described in Example 6.

EXAMPLE 31

Pyrolysis of the thermoset from Example 31—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. 15% of the Co units in the sample were found to be present as nanoparticles of FeCoB (30-50 nm). 80% of the Co units were present as Co nanoparticles (80-100 nm) with the rest as amorphous Co compounds of Si and B. Nanoparticles of SiC were also observed in the pyrolysis residue.

EXAMPLE 32

Reaction of $Co_2(CO)_8$ with 4 at a ratio of Co:4=1:1—Reagents 4 (0.545 g, 1.0 and $Co_2(CO)_8$ (0.365 g, 1.099 mmol) were taken in separate flame dried Schlenk flasks under argon. The reagents were dissolved in the non-polar solvent hexane and cooled to −78° C. in dry ice/isopropanol bath. Subsequently, the solution of 4 was transferred to the flask containing the Co reagent solution using a cannula. After the addition, the solution was warmed to room temperature. The observations during the monitoring of the reaction (by FTIR spectroscopy) and the workup of the product were as in Example 5. Yield=99.5%.

EXAMPLE 33

Thermoset formation from the reaction product in Example 32—A 0.1 g portion of the reaction product from Example 32 was taken in a ceramic crucible and was placed in a TGA instrument. The sample was thermally treated as described in Example 6.

EXAMPLE 34

Figure 6:
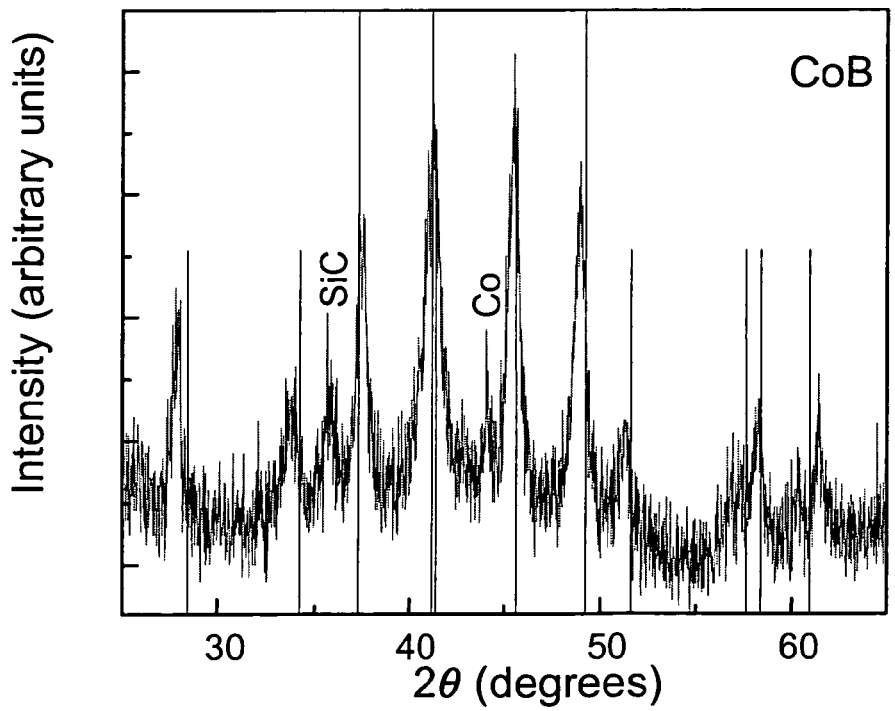
FIG. 6 shows the X-ray diffraction spectrum of the pyrolysis residue obtained in Example 34.

Pyrolysis of the thermoset from Example 33—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy (FIG. 6). 85% of the Co units in the sample were found to be present as nanoparticles of FeCo alloy (50-70 nm). 10% of the Co units were present as Co nanoparticles (30-50 nm) with the rest as amorphous Co compounds of Si, etc. Nanoparticles of SiC were also observed in the pyrolysis residue.

EXAMPLE 35

Reaction of $Co_2(CO)_8$ with 4 at a ratio of Co:4=1:5—A Schlenk flask, flame-dried under vacuum, was charged with 0.073 g (0.220 mmol) of $Co_2(CO)_8$ and 15 mL of hexane was syringed into it under argon to produce a solution of the Co reactant. The solution was cooled to −78° C. in dry ice/isopropanol bath. In another flame-dried Schlenk flask 0.545 g (1.099 mmol) of 4 was dissolved in 35 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 8. Yield=99.5%.

EXAMPLE 36

Thermoset formation from the reaction product in Example 35—A 0.1 g portion of the reaction product from Example 35 was taken in a ceramic crucible and was placed in a TGA instrument. The sample was thermally treated as described in Example 6.

EXAMPLE 37

Pyrolysis of the thermoset from Example 36—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. 85% of the Co units in the sample were found to be present as nanoparticles of FeCo alloy (30-40 nm). 10% of the Co units were present as Co nanoparticles (20-30 nm) with the rest as amorphous Co compounds of Si, etc. Nanoparticles of SiC were also observed in the pyrolysis residue.

EXAMPLE 38

Reaction of $Co_2(CO)_8$ with 4 at a ratio of Co:4=3:1—A Schlenk flask, flame-dried under vacuum, was charged with 1.095 g (3.297 mmol) of $Co_2(CO)_8$ and 25 mL of hexane was syringed into it under argon to produce a solution of the Co reactant. The solution was cooled to −78° C. in dry ice/isopropanol bath. In another flame-dried Schlenk flask 0.545 g (1.099 mmol) of 4 was dissolved in 40 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 11. Yield=99.5%.

EXAMPLE 39

Thermoset formation from the reaction product in Example 38—A 0.1 g portion of the reaction product from Example 38 was taken in a ceramic crucible and was placed in a TGA instrument. The sample was thermally treated as described in Example 6.

EXAMPLE 40

Pyrolysis of the thermoset from Example 39—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. 25% of the Co units in the sample were found to be present as nanoparticles of FeCo alloy (50-70 nm). 70% of the Co units were present as Co nanoparticles (80-100 nm) with the rest as amorphous Co compounds of Si, etc. Nanoparticles of SiC were also observed in the pyrolysis residue.

EXAMPLE 41

Reaction of $Cp_2Mo_2(CO)_6$ with 1 at a ratio of Mo:1=1:1—A Schlenk flask, flame-dried under vacuum, was charged with 0.25 g (0.5495 mmol) of 1 and 5 mL of THF, which was syringed into it under argon. In another flame-dried Schlenk flask $Cp_2Mo_2(CO)_6$ (0.269 g; 0.5495 mmol) was dissolved in 5 mL of THF under argon and the solution was cannulated into the former flask. The solution at this point had a blood-red appearance. The mixture was refluxed in an oil bath for 15 h. The reaction was monitored by the periodic investigation of the reaction mixture by FTIR spectroscopy. It was allowed to proceed until the disappearance of the carbonyl absorptions of $Cp_2Mo_2(CO)_6$ (absorptions for $Cp_2Mo_2(CO)_6$ are 1960 and 1915 $cm^{-1}$) was achieved. (In this case, the completion of the reaction was indicated by four new carbonyl absorptions at 1950, 1923, 1900, and 1891 $cm^{-1}$ and a remnant diacetylene absorption at 2070 $cm^{-1}$ in the product's IR). The solvents were then removed under vacuum at 80° C. to leave behind a wine-red product. Yield=99.9%. Spectroscopic data: $^1H$ NMR (300 MHz, $CDCl_3$): δ 5.68 (s, $C_5H_5$, PR), 5.32(s, $C_5H_5$, CR), 3.5-1.5 (br, —$CB_{10}H_{10}C$—), 0.30, 0.26, 0.20, 0.11 and 0.09 (s, —$Si(CH_3)_2$—). $^{13}C$ NMR (75 MHz, $CDCl_3$); δ 241.5 (CO) (CR), 234.1(CO) (CR), 229.8 (CO) (CR), 226.5 (CO) (PR), 223.9 (CO)(PR); 132.46 (C4), 130.86 (C8), 128.79 (C5), 111.22 (C3), 95.72 ($C_5H_5$, PR), 92.29 (C6 and C7), 91.99 ($C_5H_5$, CR), 87.04 (C2), 84.85 (C1), 68.46, 68.14, 68.06 and 68.00 ($CB_{10}H_{10}C$), 1.80, 1.00, 0.47 and 0.28 (—$Si(CH_3)_2$—). IR (NaCl): 3113.76 $_{(vC—H)}$ ($C_5H_5$), 2962.07 $_{(vC—H)}$, 2598.78 $_{(vB—H)}$, 2070.44$_{(vC—C)}$ (diacetylene), 1951.67 $_{(vC—O)}$, 1922.76 $_{(vC—O)}$, 1901.02 $_{(vC—O)}$, 1888.34 $_{(vC—O)}$, 1421.12 $_{(vC—C)}$, 1257.45 $_{(vSi—C)}$, 1081.80 $_{(vSi—O—Si)}$, 822.31 $_{(vSi—C)}$, 798.36 $_{(vSi—C)}$, 586.78, 554.84, 502.94.

EXAMPLE 42

Thermoset formation from the reaction product in Example 41—A 0.1 g portion of the reaction product from Example 41 was taken in a ceramic crucible and was placed in a TGA instrument. The sample was thermally treated as described in Example 6.

EXAMPLE 43

Pyrolysis to 850° C. of the thermoset from Example 42—A portion (80 mg) of the thermoset was placed in a ceramic crucible in a TGA instrument and was thermally treated to 850° C. as follows. The sample was initially treated to 250° C. at 2° C./min and was held at this temperature for 5 min. Subsequently the sample was treated to 850° C. at 10° C./min, after which it was cooled to ambient temperature in the TGA instrument at 5° C./min. A shaped ceramic sample resulted from the thermal treatment, which was analyzed by X-ray diffraction spectroscopy (FIG. 4(a)). 85% of the Mo units in the sample were found to be present as nanoparticles of α-$Mo_2C$ (3-4 nm) and the rest as amorphous Mo compounds of Si and B. A small amount of carbon nanotubes was also present in the residue.

EXAMPLE 44

Figure 4A:
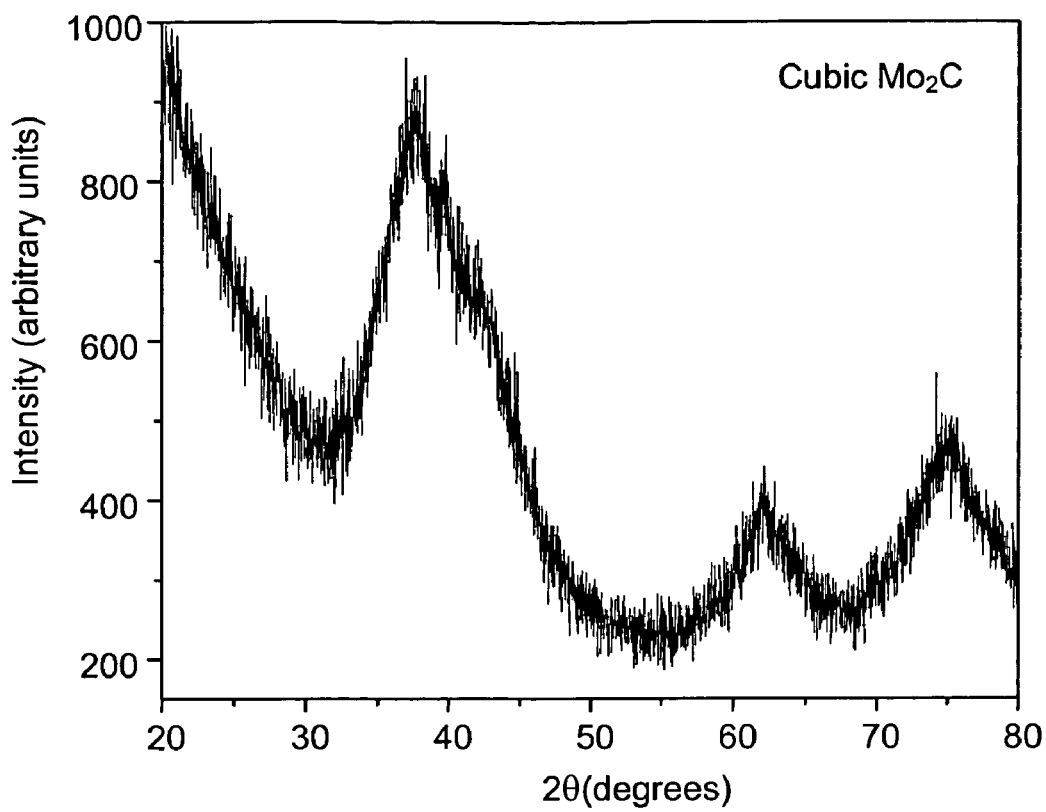
FIG. 4 shows X-ray diffraction data and resistivity data for the adduct of 1 and $Cp_2Mo_2(CO)_6$ pyrolyzed to different temperatures.
Figure 4B:
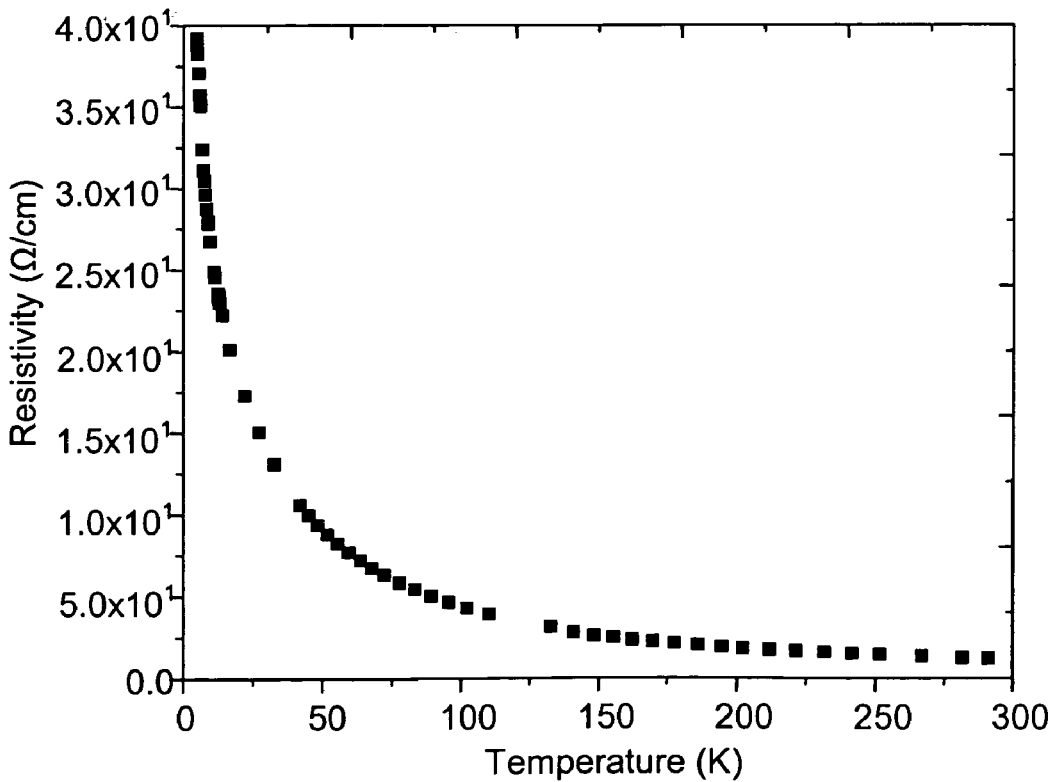
Figure 4C:
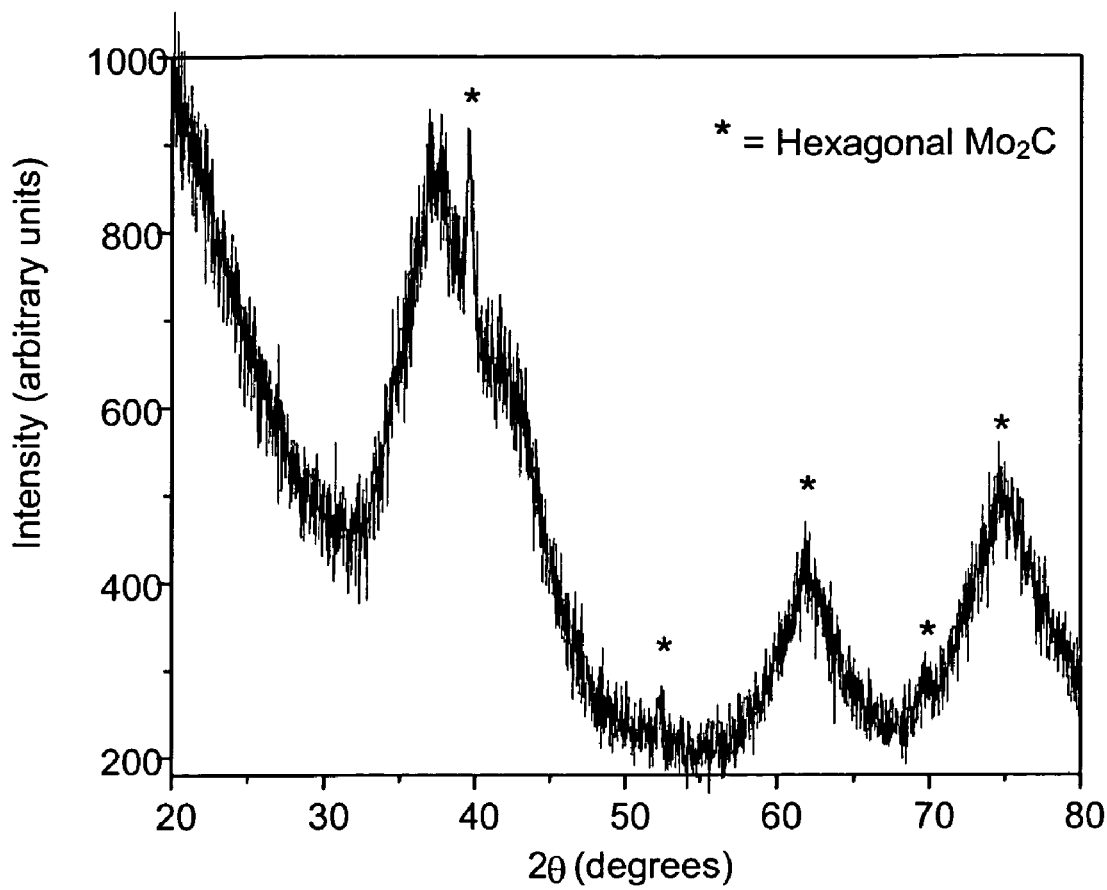

Resistivity measurement of the pyrolysis residue from Example 43—The temperature dependent dc resistivity measurement of the pyrolysis residue from Example 43 was carried out using a standard four probe configuration (FIG. 4(b)). The sample was found to be semiconducting in nature.

EXAMPLE 45

Pyrolysis to 950° C. of the thermoset from Example 42—A portion (80 mg) of the thermoset was placed in a ceramic crucible in a TGA instrument and was thermally treated as in Example 43 except that the sample was treated to 950° C. in the subsequent step. A shaped ceramic sample resulted from the thermal treatment, which was analyzed by X-ray diffraction spectroscopy (FIG. 4(c)). 80% of the Mo units in the sample were found to be present as nanoparticles of α-$Mo_2C$ (3-4 nm), 15% as nanoparticles of β-$Mo_2C$ (40-60 nm) and the rest as amorphous Mo compounds of Si and B. A small amount of carbon nanotubes was also present in the residue.

EXAMPLE 46

Figure 4D:
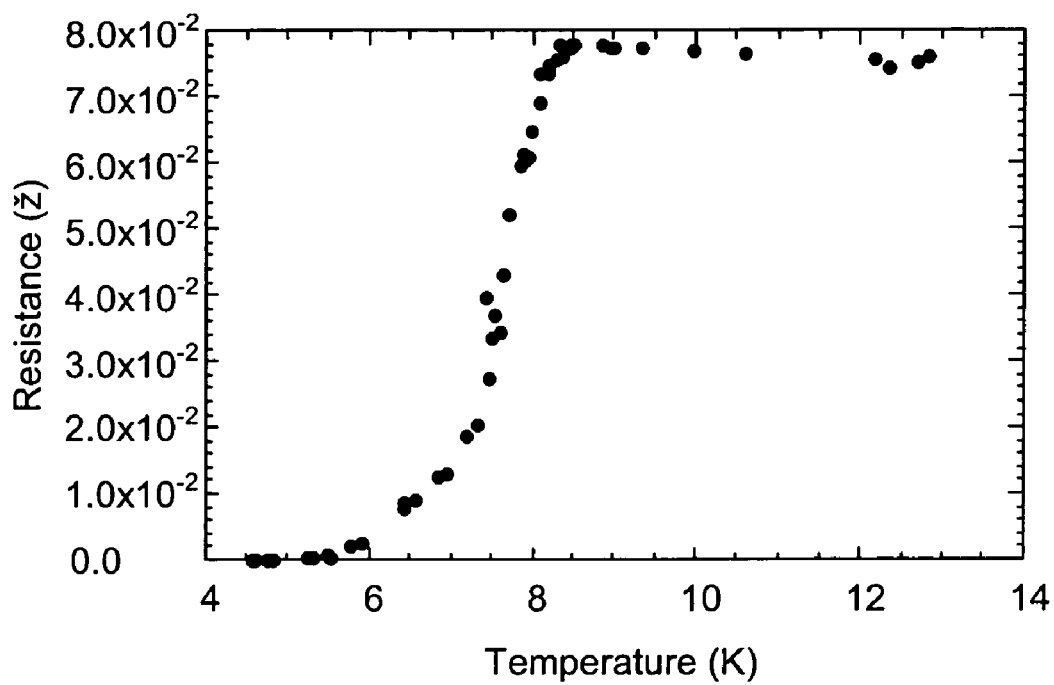
Figure 4E:
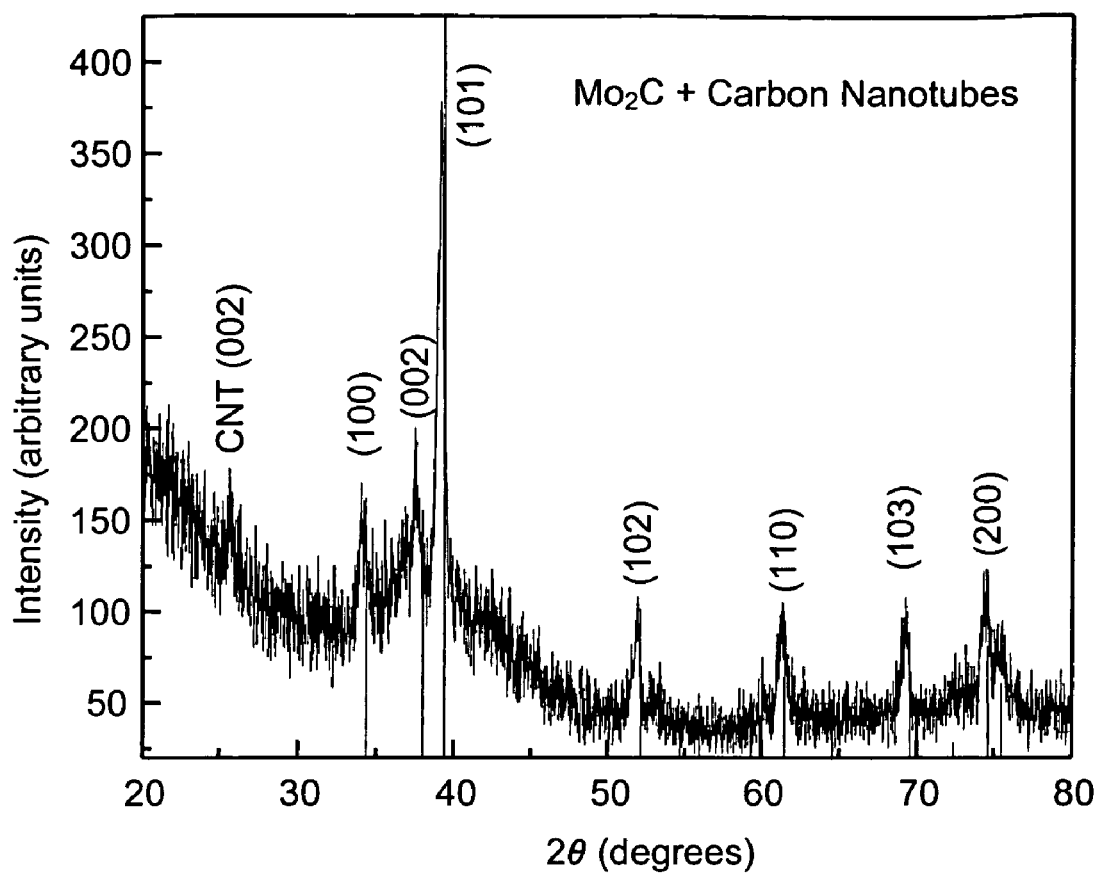
Figure 4F:
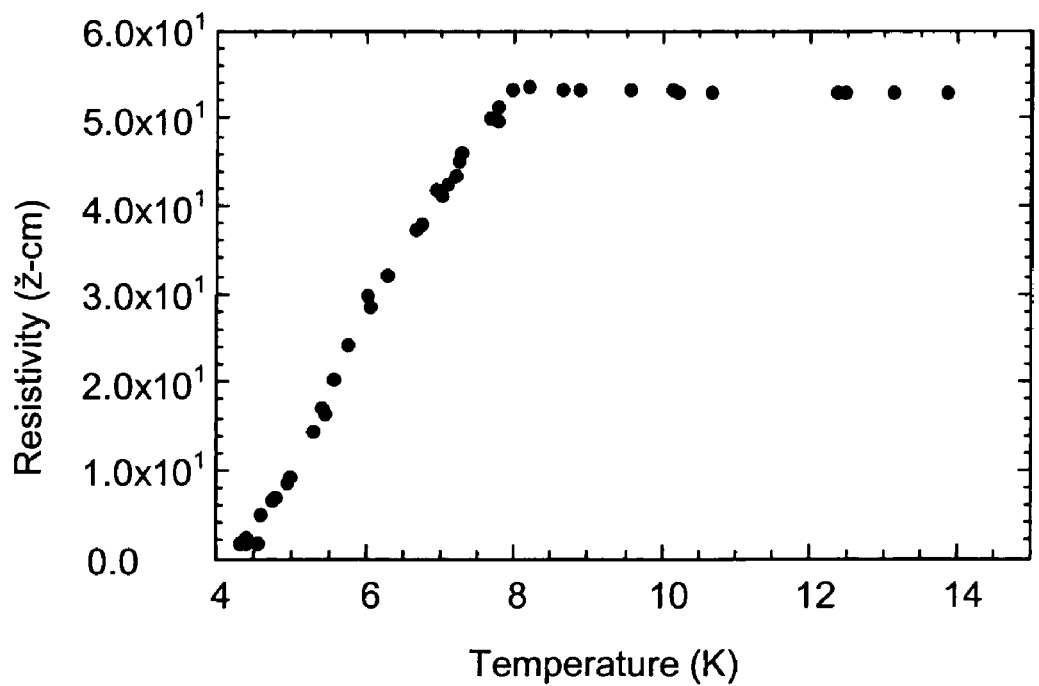
Figure 4G:
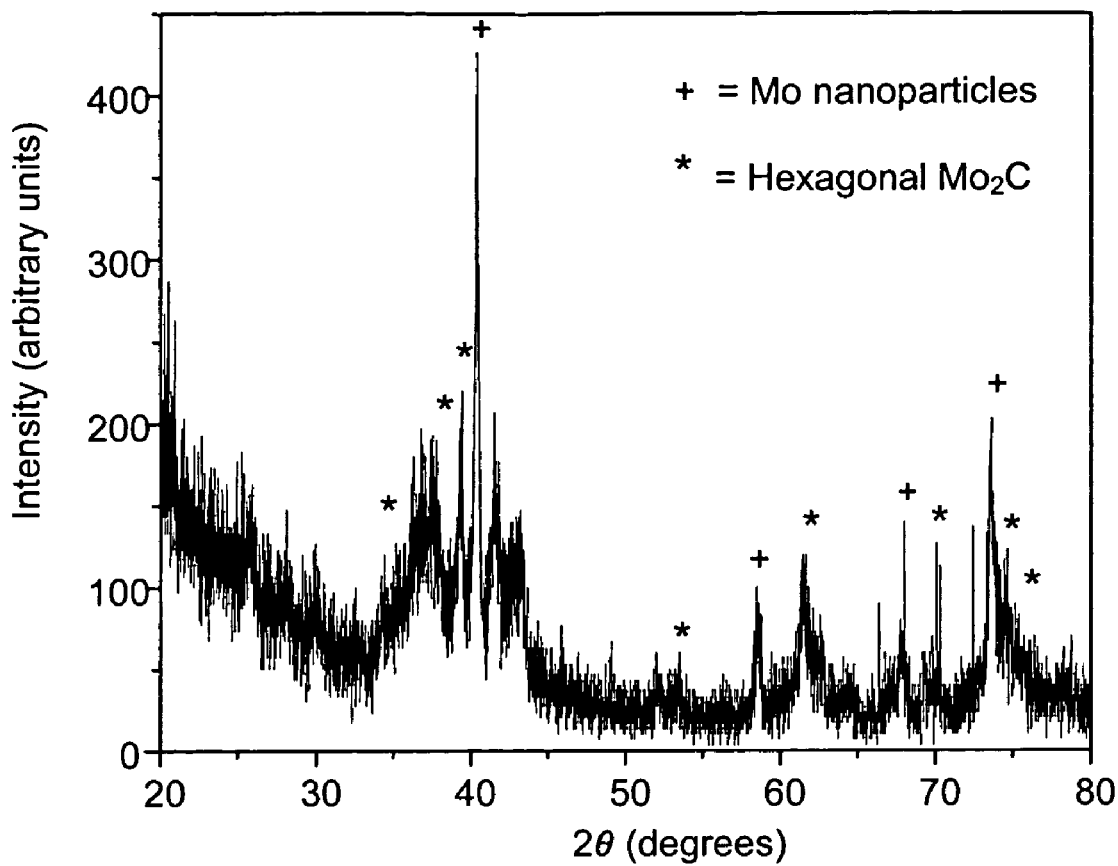
Figure 4H:
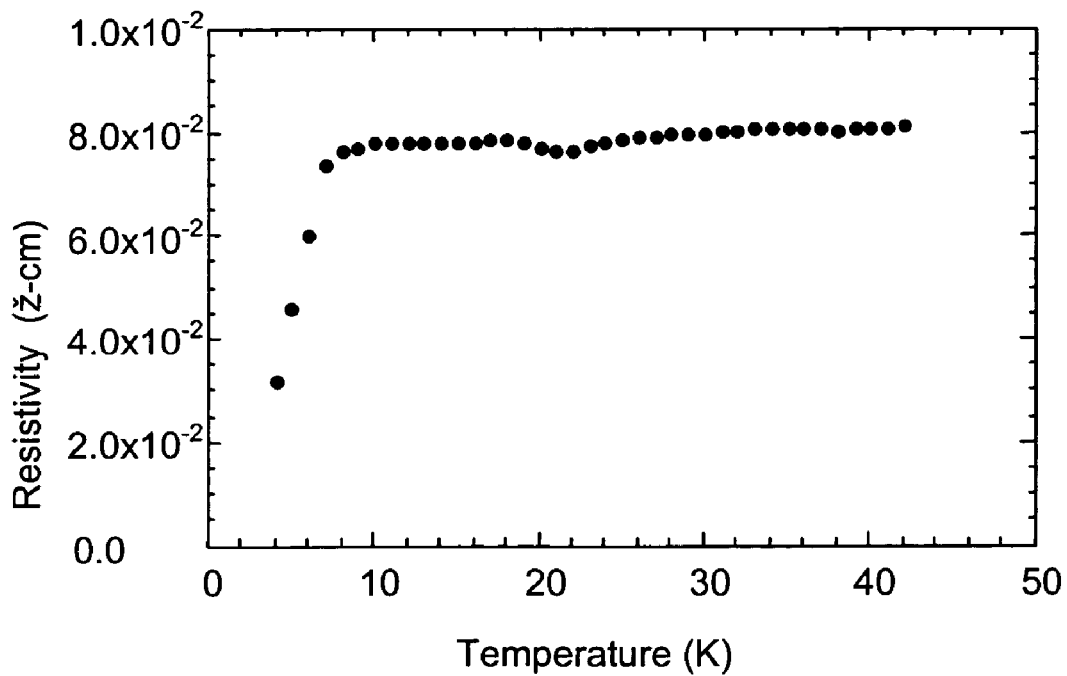

Resistivity measurement of the pyrolysis residue from Example 45—The temperature dependent dc resistivity measurement of the pyrolysis residue from Example 45 was carried out using a standard four probe configuration (FIG. 4(d)). The sample was found to be superconducting in nature with a critical temperature ($T_c$) of 8K. The drop in resistivity to 0K occurred within a 2 degree range below 8K.

EXAMPLE 47

Pyrolysis to 1000° C. of the thermoset from Example 42—A portion (80 mg) of the thermoset was placed in a ceramic crucible in a TGA instrument and was thermally treated as in Example 43 except that the sample was treated to 1000° C. in the subsequent step. A shaped ceramic sample resulted from the thermal treatment, which was analyzed by X-ray diffraction spectroscopy (FIG. 4(e)). 85% of the Mo units in the sample were found to be present as nanoparticles of β-$Mo_2C$ (40-80 nm), 10% as nanoparticles of α-$Mo_2C$ (3-4 nm) and the rest as amorphdus Mo compounds of Si and B. A larger amount of carbon nanotubes than in Example 43 was also present in the residue.

The diffraction pattern consists of eight distinct lines, which are all assigned to β-$Mo_2C$ based on an excellent fitting with literature data. The peak for the carbon in the carbon nanotubes were evident at 2θ=25.9 degrees. A question was whether all of the molybdenum units existed as β-$Mo_2C$ or whether only a small fraction of the molybdenum units were in their β-$Mo_2C$ form with the rest of molybdenum units being present as their compounds of silicon and/or boron. The broad baseline in the diffraction spectrum around the peak at 2θ=39 degrees indicated that a fraction of the molybdenum units existed in the pyrolyzed mixture as its compounds of silicon and/or boron. The peak fit analysis of the diffraction data suggested that the integrated intensity of the amorphous peak around 39 degrees in 2θ was about 20% of the overall integrated intensities of the crystalline peaks of the $Mo_2C$ phase. The diffraction profile was fitted with a Gaussian distribution function. Based on the peak fit analysis, it is estimated that in the pyrolysis product the amorphous molybdenum compounds exist up to an upper limit of 20%. Hence, the pyrolysis predominantly yields molybdenum in its β-Mo$_2$C form.

All descriptions of mechanisms are not intended to limit the scope of the claims. The preferential formation of crystalline β-Mo$_2$C during the pyrolysis could be attributed to the favorable crystallization energy of β-Mo$_2$C under the pyrolysis conditions when compared to other possible molybdenum products (with silicon and/or boron). It is possible that at conducive conditions for nucleation and growth, other crystalline molybdenum compounds of silicon or boron could be obtained from this system in preference to β-Mo$_2$C. In the amorphous fraction of the pyrolyzed residue, the formation of ternary amorphous alloys involving molybdenum, silicon and boron during the pyrolysis cannot be discounted, although the formation of such alloys has only been reported during melt or liquid quenching of pure mixtures of molybdenum, silicon and boron (Inoue et al., "Superconductivity of Mo—Si—B and W—Si—B amorphous alloys obtained by liquid quenching," *Scripta Metallurgica*, 14(2), 235-239 (1980); Inoue et al., *Proc. Int. Conf. Rapidly Quenched Met.* 4th, 2, 1245-1248 (1982)) or from arc melting of the pure materials under argon at a low temperature (Hayashi et al., "Reaction diffusion of MoSi$_2$ and Mo$_5$SiB$_2$," *Intermetallics*, 13(1), 93-100, (2005); Nunes et al., "Liquidus projection for the Mo-rich portion of the Mo—Si—B ternary system," *Intermetallics*, 8(4), 327-337 (2000)). For example, the generation of a ternary alloy such as Mo$_5$SiB$_2$ requires the arc melting of pure materials Mo (99.97%), B (99.5%), and Si (99.995%) in a cooled copper crucible under pure argon (99.998%) (Nunes, Id.). The absence of such rigorous reaction conditions possibly rules out the formation of a ternary Mo—Si—B alloy in the current pyrolysis reaction.

The carbon nanotubes formed during the pyrolysis presumably originated from the catalytic interaction of Mo atoms, clusters, or nanoparticles with the diacetylene carbons since the remaining carbon sources were not observed to have survived a temperature above 600° C. as indicated by the TGA-DTA thermogram of the reaction product. It is well known that binary transition metal catalysts containing molybdenum such as Co—Mo or Fe—Mo catalyze the formation of single wall carbon nanotubes by the CVD method from a carbon feed stock (e.g. hydrocarbon or CO). The Co or Fe in the binary catalyst is known to be the active participant in the nanotube formation with the Mo acting as a cooperatively activity-enhancing supporting species. Co or Fe in such systems is gradually reduced to the metal whereas Mo is transformed to its carbide (MO$_2$C). However, there are very few examples of molybdenum acting as a sole metal catalyst for the production of carbon nanotubes.

Figure 7:
FIG. 7 shows a TEM analysis of the pyrolysis residue obtained in Example 47.

The production of both Mo$_2$C and carbon nanotubes on pyrolysis of the Cp$_2$Mo$_2$(CO)$_6$ complex of 1 was further confirmed by TEM analysis of the pyrolysis char (FIG. 7). The fibrous networks of the carbon nanotubes in the char were clearly observed in the TEM micrographs along with the hexagonal nanoparticles of β-Mo$_2$C. The vein-like carbon nanotubes stretch to several micrometers as seen from the TEM micrographs. The sizes of the β-Mo$_2$C nanoparticles were in the range of 30-80 nm, with a few of the particles being larger than 100 nm. Together, the XRD and TEM data confirm the formation of β-Mo$_2$C in nanometric dimensions along with some carbon nanotubes.

EXAMPLE 48

Resistivity measurement of the pyrolysis residue from Example 47—The temperature dependent dc resistivity measurement of the pyrolysis residue from Example 47 was carried out using a standard four probe configuration (FIG. 4(*f*)). The sample was found to be superconducting in nature with a critical temperature (T$_c$) of 8K. The drop in resistivity to 0K occurred within a 7 degree range below 8K.

The measurements showed a broad superconductive transition beginning at 8K and with p=0 below 4K, which was the lowest temperature achieved. This broad transition is likely due to the granular, inhomogeneous nature of the sample. The two obvious candidates for superconductivity in the pyrolyzed residue are β-Mo$_2$C and carbon nanotubes. While superconductivity in Mo$_2$C was reported long ago (Meissner, *Physik*, 58, 570-571 (1930); Meissner et al., *Physik*, 65, 30-32 (1930); Meissner et al., *Physik*, 75, 521-525 (1932)), the discovery of superconductivity in ropes of single-walled carbon nanotubes is more recent (Kasumov et al., "Supercurrents Through Single-Walled Carbon Nanotubes," *Science*, 284(5419), 1508-1511 (1999); Kociak et al., "Superconductivity in Ropes of Single-Walled Carbon Nanotubes," *Phys. Rev. Lett.*, 86(11), 2416-2424 (2001)). An amorphous molybdenum-silicon-boron ternary alloy is a possible third candidate, providing that it is formed. Superconductivity has been observed in Mo—Si—B ternary C (4K) and β-MoC (2.4-3.2K or 2.78K). The α-MoC and β-MoC used in the then existing determinations were found to have had significantly lower stoichiometric composition of carbon in the lattices and thus lower amorphous alloys formed by solid or melt quenching processes (Inoue). A comparison of the observed onset temperature (8K) of the residue with the reported T$_c$ values of the three candidates shed some light on the most probable candidate for the observed superconductivity. The T$_c$ value of 8K for the pyrolysis residue is higher than that reported by Morton et al. for hexagonal β-Mo$_2$C produced from sintered molybdenum wires (5.1-5.7 K) or from vapor deposited samples (6.3-7.2K) and for α-Mo$_2$C (6.7-7.3K) (Morton et al., "Superconductivity of molybdenum and tungsten carbides," *J. Less-Common Met.*, 25(1), 97-104 (1971)). These T$_c$ determinations had replaced the then existing values for α-Mo$_2$C (4K) (Toth et al., "Low temperature heat capacities of superconducting molybdenum carbides," *Acta Met.*, 16(9), 1177-1183 (1968)) and β-Mo$_2$C (2.4-3.2K (Meissner et al., *Physik*, 65, 30-32 (1930) or 2.78K (Matthias et al., "A Search for New Superconducting Compounds," *Phys. Rev.*, 87(5), 799-800 (1952))). The α-MoC and β-MoC used in the then existing determinations were found to have had significantly lower stoichiometric composition of carbon in the lattices and thus lower carbon concentrations. The observed onset temperature of the residue is in the temperature range (8.1-12.2K) reported for hexagonal β-Mo$_2$C with a perfect stoichiometric composition, which had further refined results reported by Morton. This positions β-Mo$_2$C as a strong contender for superconductivity in the pyrolysis residue. The onset temperature is also very close to the T$_c$ values of known Mo—Si—B ternary amorphous alloys. Mo—Si—B ternary amorphous alloy ribbons with a composition Mo$_{70}$Si$_{20}$B$_{10}$ prepared by a liquid quenching method have been reported to have a T$_c$ of ~6.8K (Inoue, *Scripta Metallurgica*). Additionally, the superconducting temperature of the amorphous molybdenum-silicon-boron ternary amorphous alloys with a composition Mo$_{70-77.5}$Si$_{7.5-20}$B$_{7.5-20}$ obtained by melt quenching has been determined to be between 5.7-7.1K increasing with decreasing amount of combined Si and B mass and with increasing replacement of Si by B (Inoue, *Proc. Int. Conf. Rapidly Quenched Met. 4th*). Thus, a Mo—Si—B ternary alloy could also have been responsible for the observed superconductivity in the pyrolyzed residue. However, as previously described, the absence of very rigorous reaction conditions possibly rules out the formation of a ternary Mo—Si—B alloy and its role in the genesis of superconductivity in the pyrolytic residue. A comparison of the $T_c$ value of the pyrolyzed residue to that of the reported values for ropes of carbon nanotubes reveals that it is quite unlikely that the generated carbon nanotubes are solely responsible for the superconductivity. To date, the $T_c$ values reported for various samples of ropes of SWNT are below 1K (Kasumov; Kociak). Additionally, superconductivity in carbon nanotubes is observed only when their lengths are greater than the coherence length, ξ, thereby limiting superconductivity to long ropes of carbon nanotubes (Ferrier et al., "Superconductivity in ropes of carbon nanotubes," *Solid State Comm.*, 131(9-10), 615-623 (2004)). In the event that the carbon nanotubes formed in the pyrolysis residue are superconducting, the possibility that they have had an effect on the observed onset temperature of the mixture cannot be discounted. Thus, as expected, the experimental data from resistivity measurements of the pyrolysis residue suggests that the size range (30-80 nm) of the nanoparticles of $\beta$-Mo$_2$C produced in the current study is not small enough to have caused substantial changes in the reported conductivity of $\beta$-Mo$_2$C assuming that the superconductivity in the pyrolysis residue arose solely from $\beta$-Mo$_2$C nanoparticles.

EXAMPLE 49

TEM analysis of the pyrolysis residue from Example 47—TEM analysis (FIG. 7) of the pyrolysis residue from Example 47 using a Philips CM30 microscope operated at 300 kV confirmed the presence of $\beta$-Mo$_2$C and carbon nanotubes in the residue.

EXAMPLE 50

Pyrolysis to 1250° C. of the thermoset from Example 42—A portion (80 mg) of the thermoset was placed in a ceramic crucible in a TGA instrument and was thermally treated as in Example 43 except that the sample was treated to 1250° C. in the subsequent step. A shaped ceramic sample resulted from the thermal treatment, which was analyzed by X-ray diffraction spectroscopy (FIG. 4(*g*)); 85% of the Mo units in the sample were found to be present as nanoparticles of Mo (80-100 nm), 10% as nanoparticles of $\beta$-Mo$_2$C (3-4 nm) and the rest as amorphous, Mo compounds of Si and B. A larger amount of carbon nanotubes than in Example 43 was also present in the residue.

EXAMPLE 51

Resistivity measurement of the pyrolysis residue from Example 50—The temperature dependent dc resistivity measurement of the pyrolysis residue from Example 50 was carried out using a standard four probe configuration (FIG. 4(*h*)). The sample was found to be superconducting in nature with a critical temperature ($T_c$) of 8K. The drop in resistivity to 7K occurred within a 4-degree range below 8K.

EXAMPLE 52

Reaction of Cp$_2$Mo$_2$(CO)$_6$ with 1 at a ratio of Mo:1=1: 5—A Schlenk flask, flame-dried under vacuum, was charged with 0.25 g (0.5495 mmol) of 1 and 5 mL of THF, which was syringed into it under argon. In another flame-dried Schlenk flask Cp$_2$Mo$_2$(CO)$_6$ (0.0538 g; 0.1099 mmol) was dissolved in 5 mL of THF under argon and the solution was cannulated into the former flask. The solution at this point had a blood-red appearance. The mixture was refluxed in an oil bath for 15 h. The reaction was monitored by the periodic investigation of the reaction mixture by FTIR spectroscopy. It was allowed to proceed until the disappearance of the carbonyl absorptions of Cp$_2$Mo$_2$(CO)$_6$ (absorptions for Cp$_2$Mo$_2$(CO)$_6$ are 1960 and 1915 cm$^{-1}$) was achieved. (In this case, the completion of the reaction was indicated by four new carbonyl absorptions at 1950, 1923, 1900, and 1891 cm$^{-1}$ and a remnant diacetylene absorption at 2070 cm$^{-1}$ in the product's IR. The intensity of the diacetylene absorption was 2-3 times more than that in the Mo:1=1:1 reaction). The solvents were then removed under vacuum at 80° C. to leave behind a wine-red product. Yield=99.9%.

EXAMPLE 53

Thermoset formation from the reaction product in Example 52—A 0.1 g portion of the reaction product from Example 52 was taken in a ceramic crucible and was placed in a TGA instrument. The sample was thermally treated as described in Example 6.

EXAMPLE 54

Pyrolysis to 1000° C. of the thermoset from Example 53—A portion (80 mg) of the thermoset was placed in a ceramic crucible in a TGA instrument and was thermally treated as in Example 43 except that the sample was treated to 1000° C. in the subsequent step. A shaped ceramic sample resulted from the thermal treatment, which was analyzed by X-ray diffraction spectroscopy. 85% of the Mo units in the sample were found to be present as nanoparticles of $\beta$-Mo$_2$C (30-40 nm), 10% as nanoparticles of $\alpha$-Mo$_2$C (3-4 nm) and the rest as amorphous Mo compounds of Si and B. A larger amount of carbon nanotubes than in Example 43 was also present in the residue.

EXAMPLE 55

Reaction of Cp$_2$Mo$_2$(CO)$_6$ with 1 at a ratio of Mo:1=3: 1—A Schlenk flask, flame-dried under vacuum, was charged with 0.25 g (0.5495 mmol) of 1 and 5 mL of THF, which was syringed into it under argon. In another flame-dried Schlenk flask Cp$_2$Mo$_2$(CO)$_6$ (0.807 g; 1.649 mmol) was dissolved in 5 mL of THF under argon and the solution was cannulated into the former flask. The solution at this point had a blood-red appearance. The mixture was refluxed in an oil bath for 15 h. The reaction was monitored by the periodic investigation of the reaction mixture by FTIR spectroscopy. It was allowed to proceed until the disappearance of the carbonyl absorptions of Cp$_2$Mo$_2$(CO)$_6$ (absorptions for Cp$_2$Mo$_2$(CO)$_6$ are 1960 and 1915 cm$^{-1}$) was achieved. (In this case, the completion of the reaction was indicated by four new carbonyl absorptions of the product and remnant of Cp$_2$Mo$_2$(CO)$_6$ absorptions in the product's IR). The solvents were then removed under vacuum at 80° C. to leave behind a wine-red product. Yield=99.9%.

EXAMPLE 56

Thermoset formation from the reaction product in Example 55—A 0.1 g portion of the reaction product from Example 55 was taken in a ceramic crucible and was placed in a TGA instrument. The sample was thermally treated as described in Example 6.

EXAMPLE 57

Pyrolysis to 1000° C. of the thermoset from Example 56—A portion (80 mg) of the thermoset was placed in a ceramic crucible in a TGA instrument and was thermally treated as in Example 43 except that the sample was treated to 1000IC in the subsequent step. A shaped ceramic sample resulted from the thermal treatment, which was analyzed by X-ray diffraction spectroscopy. 80% of the Mo units in the sample were found to be present as nanoparticles of Mo (80-100 nm), 15% as nanoparticles of β-$Mo_2C$ (50-80 nm) and the rest as amorphous Mo compounds of Si and B. A larger amount of carbon nanotubes than in Example 43 was also present in the residue.

EXAMPLE 58

Reaction of $Ru_3(CO)_{12}$ with 1 at a ratio of Ru:1=1:1—Reagents 1 (0.5 g, 1.099 mmol) and $Ru_3(CO)_{12}$ (0.704 g, 1.099 mmol) were taken in separate flame dried Schlenk flasks under argon. The reagents were dissolved in ethanol. Subsequently, the solution of 1 was transferred to the flask containing the Ru reagent solution using a cannula. The solution was refluxed for 24 h. The reaction was monitored by the periodic investigation of the reaction mixture by FTIR spectroscopy. It was allowed to proceed until the disappearance of the carbonyl absorptions of $Ru_3(CO)_{12}$ (absorptions for $Ru_3(CO)_{12}$ are 2052, 2017, 1994, and 1982 $cm^{-1}$) was achieved. (In this case, the completion of the reaction was indicated by four new carbonyl absorptions at 2081, 2061, 2023, and 1961 $cm^{-1}$ and a remnant diacetylene absorption at 2070 $cm^{-1}$ in the product's IR). The product (yield =99.5%) was collected by removing hexane under vacuum with the flask placed in an oil bath at 80° C. Yield=99.9%.

EXAMPLE 59

Thermoset formation from the reaction product in Example 58—A 0.1 g portion of the reaction product from Example 58 was taken in a ceramic crucible and was placed in a TGA instrument. The sample was thermally treated as described in Example 6.

EXAMPLE 60

Pyrolysis of the thermoset from Example 59—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. 90% of the Ru units in the sample were found to be present as nanoparticles of RuB with the rest being present as amorphous Ru compounds of Si and B. The RuB nanoparticles were found to be of 45-60 nm sizes. Nanoparticles of SiC were also observed in the pyrolysis. The RuB nanoparticles were found to be magnetic in nature.

EXAMPLE 61

Reaction of $RU_3(CO)_{12}$ with 1 at a ratio of Ru:1=1:5—Reagents 4 (0.5 g, 1.099 mmol) and $Ru_3(CO)_{12}$ (0.422 g, 0.219 mmol) were taken in separate flame dried Schlenk flasks under argon. The reagents were dissolved in ethanol. Subsequently, the solution of 1 was transferred to the flask containing the Ru reagent solution using a cannula. The solution was refluxed for 24 h. The reaction was monitored by the periodic investigation of the reaction mixture by FTIR spectroscopy. (In this case, the completion of the reaction was indicated by four new carbonyl absorptions at 2081, 2061, 2023, and 1961 $cm^{-1}$ and a remnant diacetylene absorption at 2070 $cm^{-1}$ in the product's IR. The intensity of the diacetylene absorption was 2-3 times more than that in the Ru:1=1:1 reaction). The product (yield =99.5%) was collected by removing hexane under vacuum with the flask placed in an oil bath at 80° C. Yield=99.9%.

EXAMPLE 62

Thermoset formation from the reaction product in Example 61—A 0.1 g portion of the reaction product from Example 61 was taken in a ceramic crucible and was placed in a TGA instrument. The sample was thermally treated as described in Example 6.

EXAMPLE 63

Pyrolysis of the thermoset from Example 62—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. 90% of the Ru units in the sample were found to be present as nanoparticles of RuB with the rest being present as amorphous Ru compounds of Si and B. The RuB nanoparticles were found to be of 25-40 nm sizes. Nanoparticles of SiC were also observed in the pyrolysis.

EXAMPLE 64

Reaction of $Ru_3(CO)_{12}$ with 1 at a ratio of Ru:1=3:1—Reagents 1(0.5 g, 1.099 mmol) and $Ru_3(CO)_{12}$ (2.112 g, 3.297 mmol) were taken in separate flame dried Schlenk flasks under argon. The reagents were dissolved in ethanol. Subsequently, the solution of 1 was transferred to the flask containing the Ru reagent solution using a cannula. The solution was refluxed for 24 h. The reaction was monitored by the periodic investigation of the reaction mixture by FTIR spectroscopy. (In this case, the completion of the reaction was indicated by four new carbonyl absorptions at 2081, 2061, 2023, and 1961 $cm^{-1}$ and remnant of $Ru_3(CO)_{12}$ absorptions in the product's IR). The product (yield =99.5%) was collected by removing hexane under vacuum with the flask placed in an oil bath at 80° C. Yield=99.9%.

EXAMPLE 65

Thermoset formation from the reaction product in Example 64—A 0.1 g portion of the reaction product from Example 64 was taken in a ceramic crucible and was placed in a TGA instrument. The sample was thermally treated as described in Example 6.

EXAMPLE 66

Pyrolysis of the thermoset from Example 65—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. 80% of the Ru units in the sample were found to be present as nanoparticles of Ru, 15% as nanoparticles of RuB (30-40 nm) with the rest being present as amorphous Ru compounds of Si and B. The Ru nanoparticles were found to be of 75-110 nm sizes. Nanoparticles of SiC were also observed in the pyrolysis.

EXAMPLE 67

Reaction of $Co_2(CO)_8$ and $Fe(CO)_5$ with 1 at a ratio of (Co+Fe):1=1:1—Reagents 1 (0.5 g, 1.099 mmol) and a mixture of $Co_2(CO)_8$ (0.183 g, 0.5495 mmol) and $Fe(CO)_5$ (0.108 g, 0.5495 mmol) were taken in separate flame dried Schlenk flasks under argon. The reagents were dissolved in the nonpolar solvent hexane and cooled to −78° C. in dry ice/isopropanol bath. Subsequently, the solution of 1 was transferred to the flask containing the Co reagent solution using a cannula. After the addition, the solution was warmed to room temperature. The reaction was monitored by the periodic investigation of the reaction mixture by FTIR spectroscopy. It was allowed to proceed until the disappearance of the carbonyl absorptions of $Co_2(CO)_8$ and $Fe(CO)_5$ (absorptions for $Co_2(CO)_8$ are 2022, 1847, and 1828 $cm^{-1}$; for $Fe(CO)_5$ are 2013 and 2005 $cm^{-1}$) was achieved. (In this case, the completion of the reaction was indicated by new carbonyl absorptions at 2097, 2062, 2030, 1815, 1735, and 1695 $cm^{-1}$ and a remnant diacetylene absorption at 2070 $cm^{-1}$ in the product's IR). The product (yield =99.5%) was collected by removing hexane under vacuum with the flask placed in an oil bath at 80° C. Yield 99.9%.

EXAMPLE 68

Thermoset formation from the reaction product in Example 67—A 0.1 g portion of the reaction product from Example 67 was taken in a ceramic crucible and was placed in a TGA instrument. The sample was thermally treated as described in Example 6.

EXAMPLE 69

Pyrolysis of the thermoset from Example 68—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. 90% of the Co and Fe units in the sample were found to be present as nanoparticles of FeCoB, 5% each of Co and Fe as nanoparticles of Co and Fe, respectively, with the rest being present as amorphous Co and Fe compounds of Si and B. The FeCoB nanoparticles were found to be of 60-80 nm sizes. Nanoparticles of SiC were also observed in the pyrolysis.

EXAMPLE 70

Reaction of $Co_2(CO)_8$ and $Fe(CO)_5$ with 1 at a ratio of (Co+Fe):1=1:5—Reagents 1 (0.5 g, 1.099 mmol) and a mixture of $Co_2(CO)_8$ (0.037 g, 0.1099 mmol) and $Fe(CO)_5$ (0.022 g, 0.1099 mmol) were taken in separate flame dried Schlenk flasks under argon. The reagents were dissolved in the nonpolar solvent hexane and cooled to −78° C. in dry ice/isopropanol bath. Subsequently, the solution of 1 was transferred to the flask containing the Co reagent solution using a cannula. After the addition, the solution was warmed to room temperature. The reaction was monitored by the periodic investigation of the reaction mixture by FTIR spectroscopy. (In this case, the completion of the reaction was indicated by new carbonyl absorptions at 2097, 2062, 2030, 1815, 1735, and 1695 $cm^{-1}$ and a remnant diacetylene absorption at 2070 $cm^{-1}$ in the product's IR. The intensity of the diacetylene absorption was 2-3 times more than that in the Co+Fe:1=1:1 reaction)). The product (yield =99.5%) was collected by removing hexane under vacuum with the flask placed in an oil bath at 80° C. Yield=99.9%.

EXAMPLE 71

Thermoset formation from the reaction product in Example 70—A 0.1 g portion of the reaction product from Example 70 was taken in a ceramic crucible and was placed in a TGA instrument. The sample was thermally treated as described in Example 6.

EXAMPLE 72

Pyrolysis of the thermoset from Example 71—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. 90% of the Co and Fe units in the sample were found to be present as nanoparticles of FeCoB, 5% each of Co and Fe as nanoparticles of Co and Fe, respectively, with the rest being present as amorphous Co and Fe compounds of Si and B. The FeCoB nanoparticles were found to be of 30-50 nm sizes. Nanoparticles of SiC were also observed in the pyrolysis.

EXAMPLE 73

Reaction of $Co_2(CO)_8$ and $Fe(CO)_5$ with 1 at a ratio of (Co+Fe):1=3:1—Reagents 1 (0.5 g, 1.099 mmol) and a mixture of $Co_2(CO)_8$ (0.549 g, 1.649 mmol) and $Fe(CO)_5$ (0.324 g, 1.649 mmol) were taken in separate flame dried Schlenk flasks under argon. The reagents were dissolved in the nonpolar solvent hexane and cooled to −78° C. in dry ice/isopropanol bath. Subsequently, the solution of 1 was transferred to the flask containing the Co reagent solution using a cannula. After the addition, the solution was warmed to room temperature. The reaction was monitored by the periodic investigation of the reaction mixture by FTIR spectroscopy. (In this case, the completion of the reaction was indicated by new carbonyl absorptions at 2097, 2062, 2030, 1815, 1735, and 1695 $cm^{-1}$ and the remnant of $Co_2(CO)_8$ and $Fe(CO)_5$ absorptions in the product's IR). The product (yield=99.5%) was collected by removing hexane under vacuum with the flask placed in an oil bath at 80° C. Yield=99.9%.

EXAMPLE 74

Thermoset formation from the reaction product in Example 73—A 0.1 g portion of the reaction product from Example 73 was taken in a ceramic crucible and was placed in a TGA instrument. The sample was thermally treated as described in Example 6.

EXAMPLE 75

Pyrolysis of the thermoset from Example 74—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. 85% of the Co and Fe units in the sample were found to be present as nanoparticles of FeCo alloy, 5% of Co and Fe as nanoparticles of FeCoB, with the rest being present as amorphous Co and Fe compounds of Si and B. The FeCo alloy nanoparticles were found to be of 70-110 nm sizes. Nanoparticles of SiC were also observed in the pyrolysis.

EXAMPLE 76

Reaction of (hfac)Cu(COD) with 1 at a ratio of Cu:1 =1:1 Reagents 1 (0.5 g, 1.099 mmol) and (hexafluroacetvlacetonate)Cu(cyclooctadiene)((hfac)Cu(COD)) (0.416 g, 1.099 mmol) were taken in separate flame dried Selilenk flasks under argon. The reagents were dissolved in THF. Subsequently, the solution of 1 was transferred to the flask containing the Cu reagent solution using a cannula. The mixture was stirred at room temperature for 5 h. The remnant diacetylene absorption at 2070 cm$^{-1}$ was observed in the product's IR. The product (yield=99.5%) was collected by removing hexane under vacuum with the flask placed in an oil bath at 80° C. Yield=99.9%.

EXAMPLE 77

Thermoset formation from the reaction product in Example 76—A 0.1 g portion of the reaction product from Example 76 was taken in a ceramic crucible and was placed in a TGA instrument. The sample was thermally treated as described in Example 6.

EXAMPLE 78

Figure 8:
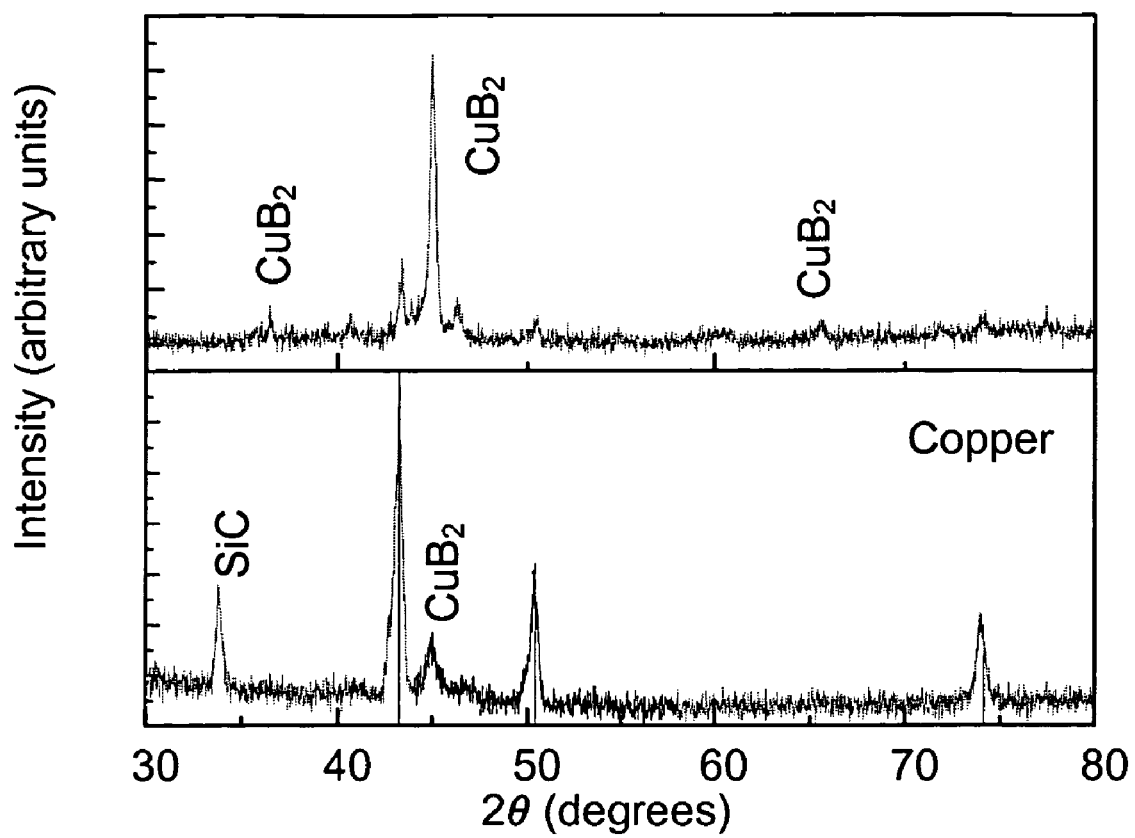
FIG. 8 shows the X-ray diffraction spectrum of the pyrolysis residue obtained in Example 78.

Pyrolysis of the thermoset from Example 77—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy (FIG. 8; top). 98% of the Cu units in the sample were found to be present as nanoparticles of $CuB_2$, an electronic analog of the known superconducting $MgB_2$, with the rest being present as crystalline Cu compounds of Si and B. The $CuB_2$ nanoparticles were found to be of 90-120 nm sizes.

EXAMPLE 79

Resistivity measurement of the pyrolysis residue from Example 78—The temperature dependent dc resistivity measurement of the pyrolysis residue from Example 78 was carried out using a standard four probe configuration. The sample was found to be insulating in nature.

EXAMPLE 80

Reaction of (hfac)Cu(COD) with 1 at a ratio of Cu:1=1:5—Reagents 1 (0.5 g, 1.099 mmol) and (hfac)Cu(COD) (0.083 g, 0.219 mmol) were taken in separate flame dried Schlenk flasks under argon. The reagents were dissolved in THF. Subsequently, the solution of 1 was transferred to the flask containing the Cu reagent solution using a cannula. The mixture was stirred at room temperature for 5 h. The remnant diacetylene absorption at 2070 cm$^{-1}$ (about 2-3 times more intense than in Example 76) was observed in the product's IR. The product (yield =99.5%) was collected by removing hexane under vacuum with the flask placed in an oil bath at 80° C. Yield=99.9%.

EXAMPLE 81

Thermoset formation from the reaction product in Example 80—A 0.1 g portion of the reaction product from Example 80 was taken in a ceramic crucible and was placed in a TGA instrument. The sample was thermally treated as described in Example 6.

EXAMPLE 82

Pyrolysis of the thermoset from Example 81—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy. 98% of the Cu units in the sample were found to be present as nanoparticles of $CuB_2$, with the rest being present as crystalline Cu compounds of Si and B. The $CuB_2$ nanoparticles were found to be of 60-80 nm sizes.

EXAMPLE 83

Resistivity measurement of the pyrolysis residue from Example 82—The temperature dependent dc resistivity measurement of the pyrolysis residue from Example 82 was carried out using a standard four probe configuration. The sample was found to be insulating in nature.

EXAMPLE 84

Reaction of (hfac)Cu(COD) with 1 at a ratio of Cu:1=3:1—Reagents 1 (0.5 g, 1.099 mmol) and (hfac)Cu(COD) (1.248 g, 3.297 mmol) were taken in separate flame dried Schlenk flasks under argon. The reagents were dissolved in THF. Subsequently, the solution of 1 was transferred to the flask containing the Cu reagent solution using a cannula. The mixture was stirred at room temperature for 5 h. The product (yield=99.5%) was collected by removing hexane under vacuum with the flask placed in an oil bath at 80° C. Yield=99.9%.

EXAMPLE 85

Thermoset formation from the reaction product in Example 84—A 0.1 g portion of the reaction product from Example 84 was taken in a ceramic crucible and was placed in a TGA instrument. The sample was thermally treated as described in Example 6.

EXAMPLE 86

Pyrolysis of the thermoset from Example 85—A portion (80 mg) of the thermoset was placed in a ceramic crucible in a TGA instrument and was thermally treated as in Example 7. A shaped ceramic sample resulted from the thermal treatment, which was analyzed by X-ray diffraction spectroscopy (FIG. 8; bottom). 85% of the Cu units in the sample were found to be present as nanoparticles of $CuB_2$, 10% as CuB nanoparticles with the rest being present as crystalline Cu compounds of Si and B. The Cu nanoparticles were found to be of 90-110 nm sizes. Nanoparticles of SiC were also observed in the pyrolysis.

EXAMPLE 87

Resistivity measurement of the pyrolysis residue from Example 86—The temperature dependent dc resistivity measurement of the pyrolysis residue from Example 86 was carried out using a standard four probe configuration. The sample was found to be insulating in nature.

EXAMPLE 88

Physical mixing of $MgCl_2$ with 1 at a ratio of Mg:1=1:1:— Reagents 1 (0.5 g, 1.099 mmol) and $MgCl_2$ (0.105 g, 1.099 mmol) were physically ground together in a ceramic mortar using a pestle. A pasty mixture was obtained. Yield=100%.

EXAMPLE 89

Thermoset formation from the composition in Example 88—A 0.1 g portion of the addition product from Example 88 was taken in a ceramic crucible and was placed in a TGA instrument. The sample was thermally treated as described in Example 6.

EXAMPLE 90

Pyrolysis of the thermoset from Example 89—A portion (80 mg) of the thermoset was placed in a ceramic crucible in a TGA instrument and was thermally treated to 1000° C. at 10° C./min. A shaped ceramic sample resulted from the thermal treatment, which was analyzed by X-ray diffraction spectroscopy. 40% of the Mg units in the sample were found to be present as nanoparticles of $MgB_2$ (40-60 nm) and 30% as $Mg_2Si$ (30-50 nm) nanoparticles with the rest being present as amorphous Mg compounds. Nanoparticles of SiC were also observed in the pyrolysis residue.

EXAMPLE 91

Physical mixing of $SmCl_2$ with 1 at a ratio of Sm:1=1:1— Reagents 1 (0.5 g, 1.099 mmol) and $SmCl_2$ (0.243 g, 1.099 mmol) were physically ground together in a ceramic mortar using a pestle. A pasty mixture was obtained. Yield=100%.

EXAMPLE 92

Thermoset formation from the composition in Example 91—A 0.1 g portion of the addition product from Example 91 was taken in a ceramic crucible and was placed in a TGA instrument. The sample was thermally treated as described in Example 6.

EXAMPLE 93

Pyrolysis of the thermoset from Example 92—A portion (80 mg) of the thermoset was placed in a ceramic crucible in a TGA instrument and was thermally treated to 1000° C. at 10° C./min. A shaped ceramic sample resulted from the thermal treatment, which was analyzed by X-ray diffraction spectroscopy. 80% of the Sm units in the sample were found to be present as nanoparticles of $SmB_6$ with the rest being present as amorphous Sm compounds of Si and C. The SmB6 nanoparticles were found to be of 30-60 nm sizes. Nanoparticles of SiC were also observed in the pyrolysis residue.

EXAMPLE 94

Physical mixing of $SmCl_2$ and $Co_2(CO)_8$ with 1 at a ratio of (Sm+Co):1=1:1—Reagents 1 (0.5 g, 1.099 mmol), $SmCl_2$ (0.122 g, 0.550 mmol) and $Co_2(CO)_8$ (0.188 g, 0,550 mmol) were physically ground together in a ceramic mortar using a pestle. A pasty mixture was obtained. Yield=100%.

EXAMPLE 95

Thermoset formation from the composition in Example 94—A 0.1 g portion of the addition product from Example 94 was taken in a ceramic crucible and was placed in a TGA instrument. The sample was thermally treated as described in Example 6.

EXAMPLE 96

Pyrolysis of the thermoset from Example 95—A portion (80 mg) of the thermoset was placed in a ceramic crucible in a TGA instrument and was thermally treated to 1000° C. at 10° C./min. A shaped ceramic sample resulted from the thermal treatment, which was analyzed by X-ray diffraction spectroscopy. 70% of the Sm and Co units in the sample were found to be present as nanoparticles of SmCo with the rest being present as $SmB_6$, CoB, and amorphous Sm and Co compounds of Si and C. The SmCo nanoparticles were found to be of 50-70 nm sizes. Nanoparticles of SiC were also observed in the pyrolysis residue.

EXAMPLE 97

Physical mixing of $AlCl_2$ with 1 at a ratio of Al:1=1:1— Reagents 1 (0.5 g, 1099 mmol) and $AlCl_2$ (0.147 g, 1.099 mmol) were physically ground together in a ceramic mortar using a pestle. A pasty mixture was obtained. Yield=100%.

EXAMPLE 98

Thermoset formation from the composition in Example 97—A 0.1 g portion of the addition product from Example 97 was taken in a ceramic crucible and was placed in a TGA instrument. The sample was thermally treated as described in Example 6.

EXAMPLE 99

Pyrolysis of the thermoset from Example 98—A portion (80 mg) of the thermoset was placed in a ceramic crucible in a TGA instrument and was thermally treated to 1000° C. at 10° C./min. A shaped ceramic sample resulted from the thermal treatment, which was analyzed by X-ray diffraction spectroscopy. 35% of the Al units in the sample were found to be present as nanoparticles of $AlB_2$ (50-70 nm) and 30% as $AlSi_2$ (45-65 nm) nanoparticles with the rest being present as amorphous Mg compounds. Nanoparticles of SiC were also observed in the pyrolysis residue.

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What is claimed is:

1. A ceramic made by a method comprising:
    providing a composition comprising:
        one or more compounds selected from siloxane linear polymer, metallic linear polymer, thermoset of a siloxane linear polymer, and thermoset of a metallic linear polymer, the compound comprising a backbone comprising:
        an acetylenic repeat unit; and
        one or more repeat units selected from —$SiR_2$—(O—$SiR_2)_n$— and —$SiR_2$—(O—$SiR_2)_n$-[Cb-$SiR_2$—(O—$SiR_2)_n]_m$—;
            wherein each R is an independently selected organic group;

wherein each Cb is an independently selected carborane; and wherein each n is an independently selected integer greater than or equal to one; and wherein each m is an independently selected integer greater than or equal to zero;

wherein any crosslinking comprises one or more of crosslinks between acetylene groups and polycarbosiloxane crosslinks; and one or more metallic components selected from:

free metal atoms, metal clusters, or metal nanoparticles dispersed homogeneously throughout the composition;

a $(ML_x)_y$-acetylene complex in the backbone; and a metallic compound capable of reacting with the acetylenic repeat unit to form a $(ML_x)_y$-acetylene complex;

wherein each M is an independently selected metal;

wherein each L is an independently selected ligand; and wherein x and y are positive integers; and pyrolyzing the composition.

2. The ceramic of claim 1, wherein each acetylenic repeat unit consists of two groups independently selected from acetylene and $(ML_x)_y$-acetylene complex.

3. The ceramic of claim 1, wherein each M is independently selected from main group metals, transition metals, lanthanides, actinides, cobalt, molybdenum, ruthenium, iron, copper, vanadium, chromium, tungsten, manganese, technetium, rhenium, osmium, rhodium, iridium, nickel, gold, palladium, platinum, zirconium, magnesium, samarium, and aluminum.

4. The ceramic of claim 1, wherein each L is independently selected from carbonyl, cyclopentadienyl, pentamethylcyclopentadienyl, trimethylsilylcyclopentadienyl, hexafluroacetylacetonate, cyclooctadiene, acetylacetonate, methyl cyanide, methyl, oxide, thiocyanide, chloride, amino, nitro, trifluoromethylsulfide, trifluoroacetylacetonate, cyano, cyanide, and isocyanide.

5. The ceramic of claim 1, wherein each Cb is $-CB_{10}H_{10}C-$.

6. The ceramic of claim 1, wherein each R is methyl.

7. The ceramic of claim 1, wherein the metallic compound is one or more of $V(CO)_6$, $Cr(CO)_6$, $Mo(CO)_6$, $W(CO)_6$, $Mn_2(CO)_{10}$, $Tc_2CO)_{10}$, $Re_2(CO)_{10}$, $Fe(CO)_5$, $Fe_2(CO)_9$, $Fe_3(CO)_{12}$, $Ru(CO)_5$, $Ru_3(CO)12$, $Os(CO)_5$, $Os_3(CO)_{12}$, $Co_2(CO)_8$, $Co_3(CO)_{12}$, $Co_6(CO)_{16}$, $Rh_4(CO)_{12}$, $Rh_6(CO)_{16}$, $Ir_4(CO)_{12}$, $Ir_6(CO)_{16}$, $Ni(CO)_4$, $Cp(CH_3)_5Re(CO)_3$, $Cp(CH_3)_5Re(CO)_3$, $[Cp(CH_3)_5]_2Cr_2(CO)_4$, $Cp_2Fe_2(CO)_4$, $C_6H_8Fe(CO)_3$, $C_6H_8Fe(CO)_3$, $C_8H_8Fe(CO)_3$, $CpCr(CO)_3$, $Cp_2Mo_2(CO)_6$, $C_7H_8Mo(CO)_3$, $CpMn(CO)_3$, $Cp(Si(CH_3)_3)Mn(CO)_3$, $Cp(CH_3)_5Rh(CO)_2$, $Cp_2Ru_2(CO)_4$, (hexafluroacetylacetonate)Cu(cyclooctadiene), Cr(hexafluroacetylacetonate), Co(acetylacetonate) $(CH_3CN)_4Cu$(hexafluroacetylacetonate), $(CH_3)_2Au$(acetylacetonate), (cyclooctadiene)Ir(acetylacetonate), Fe(acetylacetonate), Mn(acetylacetonate), $MoO_2$(acetylacetonate)$_2$, Ni(hexafluroacetylacetonate), Ni(cyclooctadiene)$_2$, Ni(SCN)$_2$, $PdCl_2(CH_3CN)_2$, $Pd(NH_3)_2(NO_2)_2$, $Pt(NH_3)_2Cl_2$, $Rh(cyclooctadiene)_2(SO_3CF_3)$, $Rh(cyclooctadiene)Cl_2$, $Zr$(trifluoroacetylacetonate), $MgCl_2$, $SmCl_2$, and $AlCl_2$.

8. The ceramic of claim 1, wherein the backbone further comprises:

one or more metallic repeat units selected from metallocenylene, $-M'Cp_2-$, and $-M'L'_z-$;

wherein each M' is a metal;

wherein Cp is cyclopentadienyl;

wherein each L' is an independently selected ligand; and wherein each z is an integer from 2 to 6.

9. The ceramic of claim 8, wherein each metallocenylene is ferrocenylene.

10. The ceramic of claim 8, wherein each M' is independently selected from main group metals, transition metals, lanthanides, actinides, iron, ruthenium, osmium, molybdenum, zirconium, vanadium, tungsten, titanium, platinum, nickel, rhodium, and palladium.

11. The ceramic of claim 8, wherein each L' is independently selected from amino, ethylene, and cyclooctadiene.

12. The ceramic of claim 1, wherein the backbone comprises the formula:

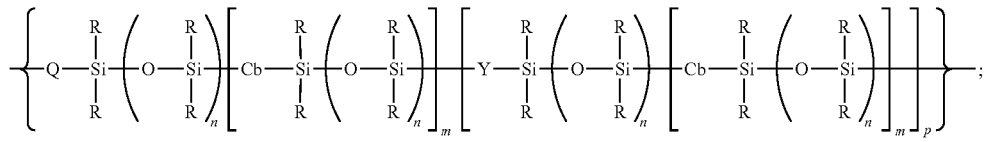

wherein Q is the acetylenic repeat unit;

wherein Y is a metallic repeat unit selected from metallocenylene, $-M'Cp_2-$, and $-M'L'L'_z-$;

wherein each M' is a metal;

wherein Cp is cyclopentadienyl;

wherein each L' is an independently selected ligand; and wherein each z is an integer from 2 to 6;

wherein each p is an integer greater than or equal to zero.

13. The ceramic of claim 12, wherein n, m, and p are, as a group, selected from:

n is 1, m is 1, and p is zero;

n is 1, m is zero, and p is zero;

n is 1, m is 1, and p is 1; and n is 1, m is zero, and p is 1.

14. The ceramic of claim 1, wherein the ceramic comprises one or more metallic components dispersed homogeneously throughout the composition, the metallic component selected from free metal atoms, metal clusters, metal nanoparticles, organometallic compounds, organometallic units, and metal salts.

15. The ceramic of claim 1, wherein the ceramic comprises carbon nanotubes.

16. The ceramic of claim 1, wherein the backbone comprises the formula:

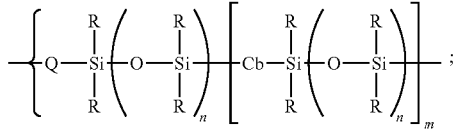

wherein Q is the acetylenic repeat unit.

17. The ceramic of claim 1, wherein the backbone consists of the formula:

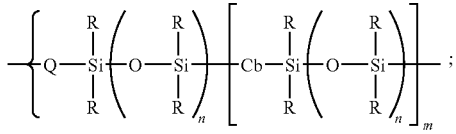

wherein Q is the acetylenic repeat unit.

18. A method of making a ceramic comprising:
providing a composition comprising:
one or more compounds selected from siloxane linear polymer, metallic linear polymer, thermoset of a siloxane linear polymer, and thermoset of a metallic linear polymer, the compound comprising a backbone comprising:
an acetylenic repeat unit; and
one or more repeat units selected from —$SiR_2$—(O—$SiR_2$)$_n$— and —$SiR_2$—(O—$SiR_2$)$_n$-[Cb-$SiR_2$—(O—$SiR_2$)$_n$]$_m$-;
wherein each R is an independently selected organic group;
wherein each Cb is an independently selected carborane; and
wherein each n is an independently selected integer greater than or equal to one; and
wherein each m is an independently selected integer greater than or equal to zero;
wherein any crosslinking comprises one or more of crosslinks between acetylene groups and polycarbosiloxane crosslinks; and
one or more metallic components selected from:
free metal atoms, metal clusters, or metal nanoparticles dispersed homogeneously throughout the composition;
a $(ML_x)_y$-acetylene complex in the backbone; and
a metallic compound capable of reacting with the acetylenic repeat unit to form a $(ML_x)_y$-acetylene complex;
wherein each M is an independently selected metal;
wherein each L is an independently selected ligand; and
wherein x and y are positive integers; and
pyrolyzing the composition.

19. The method of claim 18, wherein each acetylenic repeat unit consists of two groups independently selected from acetylene and $(ML_x)_y$-acetylene complex.

20. The method of claim 18, wherein each M is independently selected from main group metals, transition metals, lanthanides, actinides, cobalt, molybdenum, ruthenium, iron, copper, vanadium, chromium, tungsten, manganese, technetium, rhenium, osmium, rhodium, iridium, nickel, gold, palladium, platinum, zirconium, magnesium, samarium, and aluminum.

21. The method of claim 18, wherein each L is independently selected from carbonyl, cyclopentadienyl, pentamethylcyclopentadienyl, trimethylsilylcyclopentadienyl, hexafluroacetylacetonate, cyclooctadiene, acetylacetonate, methyl cyanide, methyl, oxide, thiocyanide, chloride, amino, nitro, trifluoromethylsulfide, trifluoroacetylacetonate, cyano, cyanide, and isocyanide.

22. The method of claim 18, wherein the metallic compound is one or more of $V(CO)_6$, $Cr(CO)_6$, $Mo(CO)_6$, $W(CO)_6$, $Mn_2(CO)_{10}$, $Tc_2(CO)_{10}$, $Re_2(CO)_{10}$, $Fe(CO)_5$, $Fe_2(CO)_9$, $Fe_3(CO)_{12}$, $Ru(CO)_5$, $Ru_3(CO)12$, $Os(CO)_5$, $Os_3(CO)_{12}$, $Co_2(CO)_8$, $Co_3(CO)_{12}$, $Co_6(CO)_{16}$, $Rh_4(CO)_{12}$, $Rh_6(CO)_{16}$, $Ir_4(CO)_{12}$, $Ir_6(CO)_{16}$, $Ni(CO)_4$, $Cp(CH_3)_5Re(CO)_3$, $Cp(CH_3)_5Re(CO)_3$, $[Cp(CH_3)_5]_2Cr_2(CO)_4$, $Cp_2Fe_2(CO)_4$, $C_6H_8Fe(CO)_3$, $C_6H_8Fe(CO)_3$, $C_8H_8Fe(CO)_3$, $CpCr(CO)_3$, $Cp_2Mo_2(CO)_6$, $C_7H_8Mo(CO)_3$, $CpMn(CO)_3$, $Cp(Si(CH_3)_3)Mn(CO)_3$, $Cp(CH_3)_5Rh(CO)_2$, $Cp_2Ru_2(CO)_4$, (hexafluoroacetylacetonate)Cu(cyclooctadiene), Cr(hexafluoroacetylacetonate), Co(acetylacetonate) $(CH_3CN)_4Cu$(hexafluoroacetylacetonate), $(CH_3)_2Au$(acetylacetonate), (cyclooctadiene)Ir(acetylacetonate), Fe(acetylacetonate), Mn(acetylacetonate), $MoO_2$(acetylacetonate)$_2$, Ni(hexafluoroacetylacetonate), Ni(cyclooctadiene)$_2$, $Ni(SCN)_2$, $PdCl_2(CH_3CN)_2$, $Pd(NH_3)_2(NO_2)_2$, $Pt(NH_3)_2Cl_2$, $Rh$(cyclooctadiene)$_2$($SO_3CF_3$), $Rh$(cyclooctadiene)$Cl_2$, $Zr$(trifluoroacetylacetonate), $MgCl_2$, $SmCl_2$, and $AlCl_2$.

23. The method of claim 18, wherein the backbone further comprises:
one or more metallic repeat units selected from metallocenylene, ferrocenylene, -M'$Cp_2$-, and -M'$L'_z$-;
wherein each M' is a metal;
wherein Cp is cyclopentadienyl;
wherein each L' is an independently selected ligand; and
wherein each z is an integer from 2 to 6.

24. The method of claim 23, wherein each M' is independently selected from main group metals, transition metals, lanthanides, actinides, iron, ruthenium, osmium, molybdenum, zirconium, vanadium, tungsten, titanium, platinum, nickel, rhodium, and palladium.

25. The method of claim 23, wherein each L' is independently selected from amino, ethylene, and cyclooctadiene.

26. The method of claim 18, wherein the backbone comprises the formula:

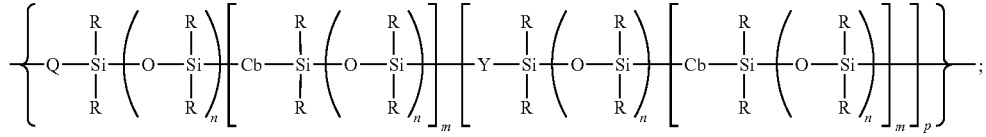

wherein Q is the acetylenic repeat unit;
wherein Y is a metallic repeat unit selected from metallocenylene, -M'$Cp_2$-, and -M'$L'_z$-;
wherein each M' is a metal;
wherein Cp is cyclopentadienyl;
wherein each L' is an independently selected ligand; and
wherein each z is an integer from 2 to 6;
wherein each p is an integer greater than or equal to zero.

27. The method of claim 26, wherein n, m, and p are, as a group, selected from:
n is 1, m is 1, and p is zero;
n is 1, m is zero, and p is zero;

n is 1, m is 1, and p is 1; and
n is 1, m is zero, and p is 1.
28. The method of claim 18, wherein the backbone comprises the formula:
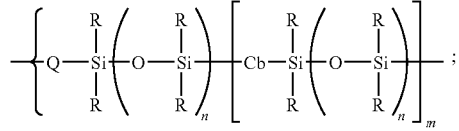
wherein Q is the acetylenic repeat unit.
29. The method of claim 18, wherein the backbone consists of the formula:
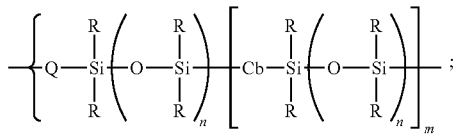
wherein Q is the acetylenic repeat unit.
* * * * *